(12) United States Patent
Kishiyama et al.

(10) Patent No.: US 10,251,166 B2
(45) Date of Patent: Apr. 2, 2019

(54) RADIO BASE STATION, USER TERMINAL AND RADIO COMMUNICATION METHOD

(71) Applicant: NTT DOCOMO, INC., Tokyo (JP)

(72) Inventors: Yoshihisa Kishiyama, Tokyo (JP); Anass Benjebbour, Tokyo (JP); Yuuya Saitou, Tokyo (JP); Kenichi Higuchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/765,965

(22) PCT Filed: Jan. 22, 2014

(86) PCT No.: PCT/JP2014/051252
§ 371 (c)(1),
(2) Date: Aug. 5, 2015

(87) PCT Pub. No.: WO2014/122994
PCT Pub. Date: Aug. 14, 2014

(65) Prior Publication Data
US 2016/0029350 A1    Jan. 28, 2016

(30) Foreign Application Priority Data

Feb. 6, 2013  (JP) .................................. 2013-021269

(51) Int. Cl.
*H04W 72/04*    (2009.01)
*H04W 16/28*    (2009.01)
(Continued)

(52) U.S. Cl.
CPC ........ *H04W 72/042* (2013.01); *H04B 7/0689* (2013.01); *H04L 5/0048* (2013.01);
(Continued)

(58) Field of Classification Search
CPC ...................................................... H04W 72/04
(Continued)

(56) References Cited

U.S. PATENT DOCUMENTS 8,693,971 B1* 4/2014 Balraj ................. H04B 7/0417
375/216
9,236,991 B2* 1/2016 Frenne ................. H04L 5/0051
(Continued)

FOREIGN PATENT DOCUMENTS

JP    2013009289 A    1/2013
WO   2009081514 A1   7/2009
(Continued)

OTHER PUBLICATIONS

International Search Report issued in corresponding application No. PCT/JP2014/051252 dated Apr. 15, 2014, 1 page.
(Continued)

*Primary Examiner* — Edan Orgad
*Assistant Examiner* — Emmanuel K Maglo
(74) *Attorney, Agent, or Firm* — Osha Liang LLP

(57) ABSTRACT

The present invention is designed to improve spectral efficiency in a radio communication system which can use non-orthogonal multiple access (NOMA). Steps are provided in which a radio base station configures one of a plurality of transmission mode including a first transmission mode, which groups a plurality of transmission methods including a transmission method to employ non-orthogonal multiple access (NOMA) and multiple-user multiple-input and multiple-output (MU-MIMO), and a second transmission mode, which groups a plurality of transmission methods including a transmission method to employ this NOMA and open-loop transmit diversity, and transmits a downlink signal for this user terminal based on the configured transmission mode.

2 Claims, 15 Drawing Sheets

SU-MIMO(2Tx)

2Tx DIVERSITY

(51) Int. Cl.
*H04L 5/00* (2006.01)
*H04W 72/08* (2009.01)
*H04B 7/06* (2006.01)
*H04B 7/0452* (2017.01)

(52) U.S. Cl.
CPC ....... *H04W 16/28* (2013.01); *H04W 72/0453* (2013.01); *H04W 72/082* (2013.01); *H04B 7/0452* (2013.01)

(58) Field of Classification Search
USPC ......................................................... 370/329
See application file for complete search history.

(56) References Cited

U.S. PATENT DOCUMENTS

| | | | |
|---|---|---|---|
| 2007/0183527 A1* | 8/2007 | Jia | H04B 7/0669 375/267 |
| 2009/0232239 A1* | 9/2009 | Ko | H04L 5/005 375/260 |
| 2009/0316807 A1* | 12/2009 | Kim | H04B 7/061 375/260 |
| 2010/0216483 A1 | 8/2010 | Tynderfeldt et al. | |
| 2010/0290548 A1 | 11/2010 | Hoshino et al. | |
| 2011/0019776 A1* | 1/2011 | Zhang | H04L 5/0023 375/340 |
| 2011/0081934 A1* | 4/2011 | Imamura | H04W 52/146 455/522 |
| 2011/0194551 A1* | 8/2011 | Lee | H04B 7/0626 370/342 |
| 2012/0114021 A1* | 5/2012 | Chung | H04B 7/155 375/211 |
| 2012/0127934 A1* | 5/2012 | Anderson | H04W 72/0406 370/329 |
| 2013/0163537 A1* | 6/2013 | Anderson | H04W 72/1284 370/329 |
| 2013/0196701 A1* | 8/2013 | Tiirola | H04J 11/0026 455/501 |
| 2013/0250879 A1* | 9/2013 | Ng | H04W 72/042 370/329 |
| 2014/0056269 A1 | 2/2014 | Zhang et al. | |
| 2014/0086160 A1* | 3/2014 | Kim | H04L 1/00 370/329 |
| 2014/0119269 A1 | 5/2014 | Guan et al. | |
| 2014/0328302 A1* | 11/2014 | Park | H04L 5/0037 370/329 |
| 2015/0117291 A1* | 4/2015 | Seo | H04L 5/001 370/312 |
| 2015/0327095 A1* | 11/2015 | Kwak | H04B 7/0621 370/252 |

FOREIGN PATENT DOCUMENTS

| | | |
|---|---|---|
| WO | 2012151735 A1 | 11/2012 |
| WO | 2013/004157 A1 | 1/2013 |

OTHER PUBLICATIONS

3GPP TR 25.913 V9.0.0; " 3rd Generation Partnership Project; Technical Specification Group Radio Access Network; Requirements for Evolved UTRA (E-UTRA) and Evolved UTRAN (E-UTRAN) (Release 9);" Dec. 2009, 18 pages.
Extended Search Report issued in corresponding European Application No. 14749132.8, dated Jul. 11, 2016 (8 pages).
K. Higuchi; "Non-orthogonal Access with Random Beamforming and Intra-beam SIC for Cellular MIMO Downlink"; IEEE, vol. 2012-89, pp. 1381-1385; Sep. 2, 2013 (5 pages).
Office Action issued in the counterpart Japanese Patent Application No. 2015-209496, dated Jan. 31, 2017 (12 pages).
Office Action issued in corresponding European Patent Application No. 14749132.8, dated Jul. 11, 2017 (6 pages).
Office Action issued in corresponding Japanese Patent Application No. 2015-209496, dated Jul. 25, 2017 (10 pages).
Samsung, "DL transmission modes for Rel-10", 3GPP TSG RAN WG1 #62, R1-104610, Madrid, Spain, Aug. 23-27, 2010 (4 pages).
Panasonic, Change Request, "Reception of DCI formats", 3GPP TSG-RAN Meeting #55, R1-084664, Prague, Czech Republic, Nov. 10-14, 2008 (9 pages).
Office Action issued in the counterpart European Patent Application No. 14749132.8, dated Jan. 30, 2018 (6 pages).
Peter Chong; "WCDMA Physical Layer (Chapter 6)"; Internet Citation, URL: www.comlab.hut.fi/opetus/238/lecture6_ch6.pdf; Jan. 26, 2002 (47 pages).
Claudio Sacchi, et al.; "Multi-rate group-orthogonal OFDMA-CDMA for broadband mobile transmission"; Telecommunication Systems, pp. 15-29; Internet Citation URL: http://2010.telfor.rs/files/radovi/TELFOR2010_03_20.pdf, Jan. 1, 2013 (15 pages).

* cited by examiner

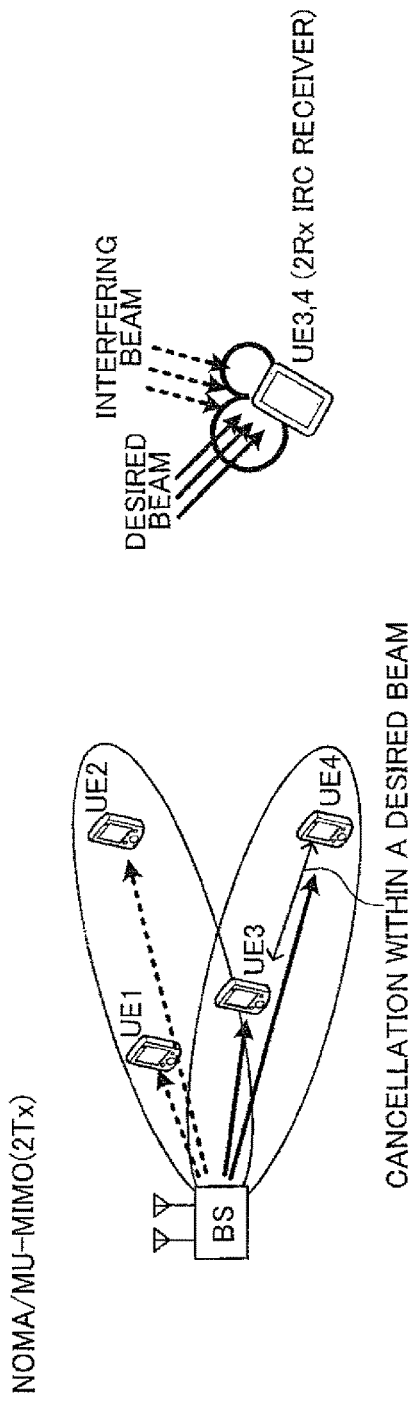
FIG.4A
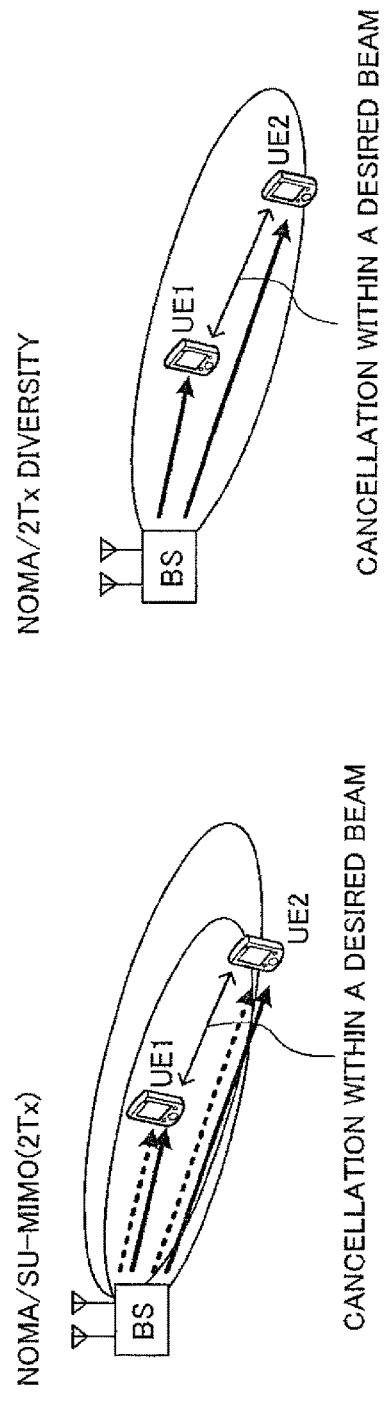
FIG.4B
FIG.4C

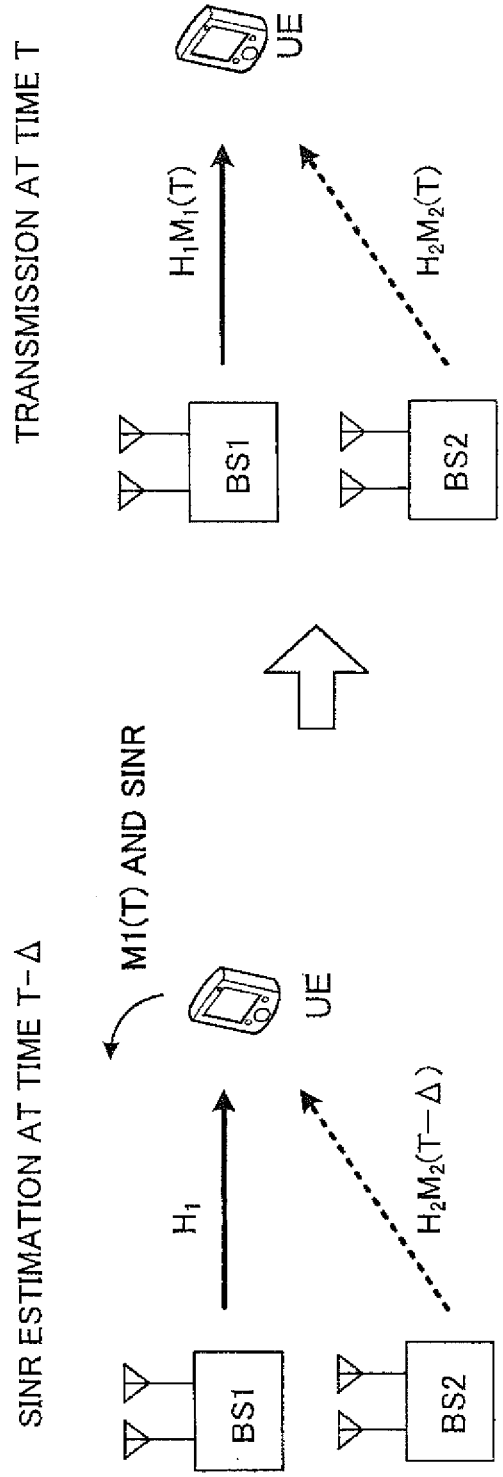

RADIO BASE STATION, USER TERMINAL AND RADIO COMMUNICATION METHOD

TECHNICAL FIELD

The present invention relates to a radio base station, a user terminal and a radio communication method in a radio communication system which can use non-orthogonal multiple access (NOMA).

BACKGROUND ART

Conventionally, in a radio communication system, various radio access schemes are employed. For example, in UMTS (Universal Mobile Telecommunications System), which is also referred to as "W-CDMA (Wideband Code Division Multiple Access)," code division multiple access (CDMA) is employed. Also, in LTE (Long Term Evolution), orthogonal frequency division multiple access (OFDMA) is employed (for example, non-patent literature 1).

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

In future radio communication systems referred to as "FRA (Future Radio Access)" and so on, a study is being conducted on radio access schemes to employ non-orthogonal multiple access (NOMA) that is premised upon canceling interference (Interference Cancellation) on the receiving side.

In these radio access methods, for example, as shown in FIG. 1, signals for user terminals UE with varying received SINRs, path losses and so on are superposed over the same radio resources that are allocated by orthogonal frequency division multiple access (OFDMA), and transmitted with different transmission power. On the receiving side, the signal for a desired user terminal is sampled by canceling signals for other user terminals.

In radio access schemes employing NOMA, it is possible to multiplex a plurality of user terminals over the same radio resources, so that improvement of spectral efficiency is anticipated. On the other hand, a significant increase in traffic is anticipated in a future communication system, and therefore further improvement of spectral efficiency is expected.

The present invention has been made in view of the above, and it is therefore an object of the present invention to provide a radio base station, a user terminal and a radio communication method that can improve spectral efficiency in a radio communication system which can use non-orthogonal multiple access (NOMA).

Solution to Problem

A radio communication method of the present invention is a radio communication method in a radio communication system in which a radio base station transmits a downlink signal to a user terminal, and has, in the radio base station, the steps of configuring one of a plurality of transmission mode including a first transmission mode which groups a plurality of transmission methods including a transmission method to employ non-orthogonal multiple access (NOMA) and multiple-user multiple-input and multiple-output (MU-MIMO), and a second transmission mode which groups a plurality of transmission methods including a transmission method to employ NOMA and open loop transmit diversity, and transmitting the downlink signal based on the configured transmission mode.

Advantageous Effects of Invention

According to the present invention, it is possible to improve spectral efficiency in a radio communication system which can use non-orthogonal multiple access (NOMA).

BRIEF DESCRIPTION OF DRAWINGS

FIG. 4 provides diagrams to explain transmission methods employing NOMA, according to a first example of the present invention;

FIG. 7 provides diagrams to explain closed-loop beamforming;

DESCRIPTION OF EMBODIMENTS

Figure 1:
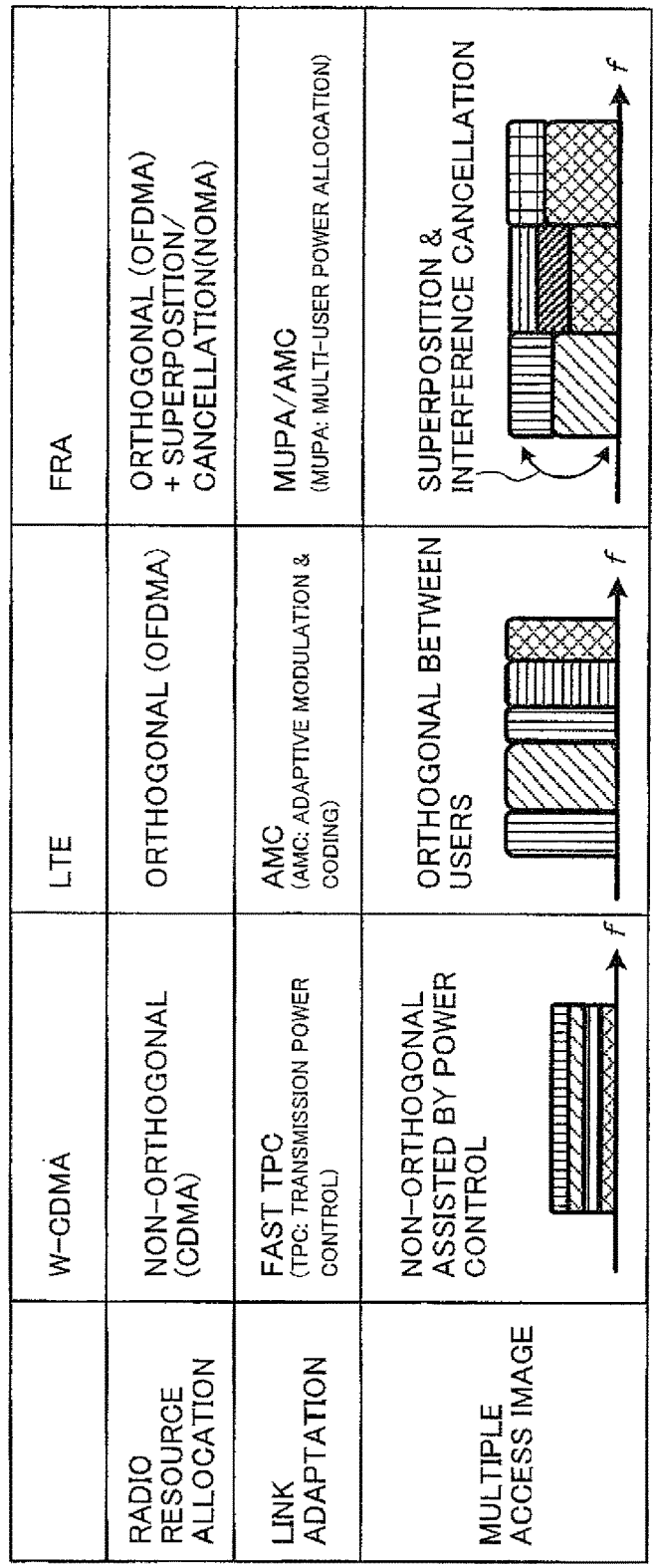
FIG. 1 is a diagram to explain radio access schemes that are employed in various radio communication systems.
Figure 2:
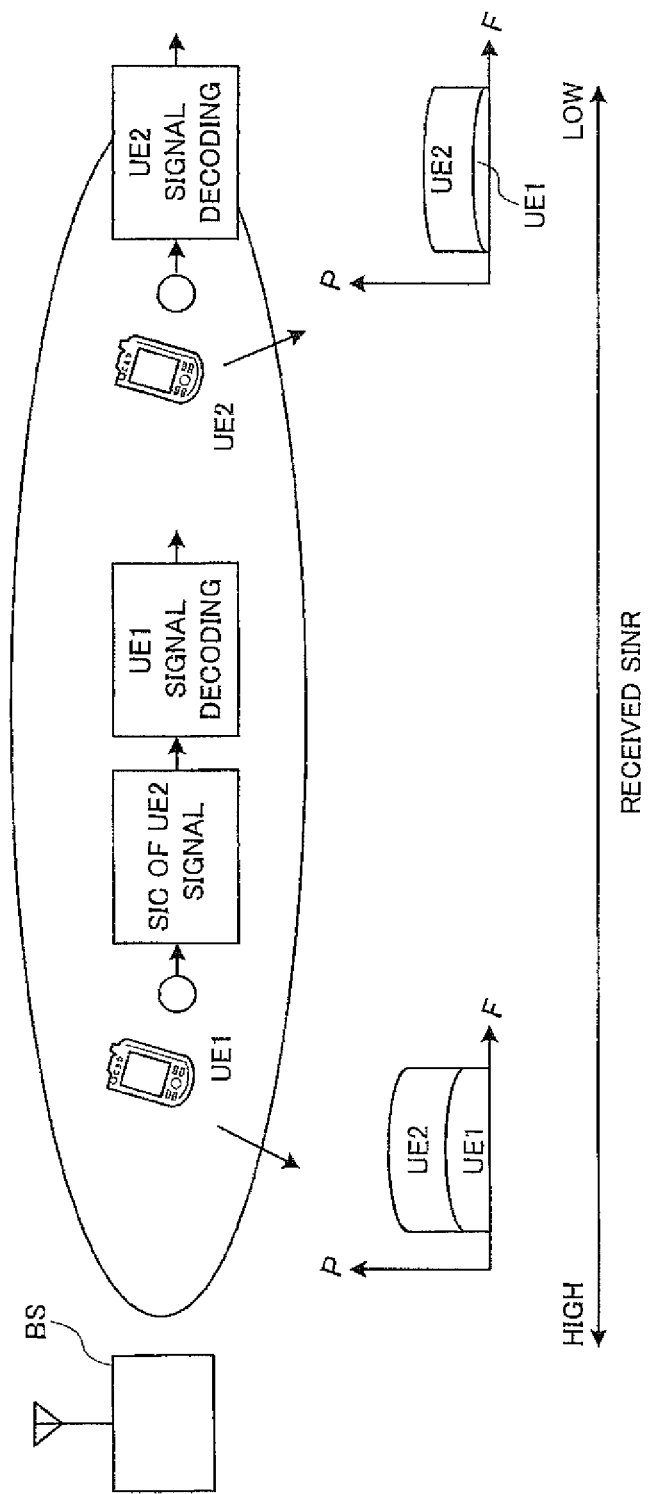
FIG. 2 is a diagram to explain downlink NOMA.

FIG. 2 is a diagram to explain non-orthogonal multiple access (NOMA) in the downlink. FIG. 2 shows a case where user terminal UE 1 is located in a central part of a cell (hereinafter referred to as a "cell center part") formed by a radio base station BS, and user terminal UE 2 is located in an edge part of the cell (hereinafter referred to as a "cell edge part"). The path loss in the cell increases from the cell center part to the cell edge part. Consequently, as shown in FIG. 2, the received SINR (Received Signal to Interference plus Noise Ratio) at user terminal UE 2 that is located in the cell edge part where the path loss is great is lower than the received SINR at user terminal UE 1 that is located in the cell center part where the path loss is low.

In NOMA, a plurality of user terminals UE are multiplexed over the same radio resources by changing transmission power in accordance with differences in interference estimate information (described later) such as the received SINR. For example, in FIG. 2, downlink signals for user terminals UE 1 and UE 2 with varying received SINRs are multiplexed over the same radio resource. Also, the downlink signal for user terminal UE 1 where the received SINR is high is transmitted with relatively small transmission power, and the downlink signal for user terminal UE 2 where the received SINR is low is transmitted with relatively large transmission power.

Also, in NOMA, a downlink signal for a subject terminal is sampled by cancelling interference signals from received signals by means of SIC (Successive Interference Cancellation). To be more specific, the downlink signal for the subject terminal is sampled by cancelling downlink signals for other user terminals where the received SINR is lower than at the subject terminal.

For example, in FIG. 2, the received SINR at user terminal UE 2 is lower than at user terminal UE 1, and therefore the downlink signal for user terminal UE 2 is transmitted with larger transmission power than the downlink signal for user terminal UE 1. Consequently, although user terminal UE 1 receives the downlink signal for user terminal UE 2 as an interference signal, this interference signal is adequately cancelled by means of SIC. As a result, user terminal UE 1 can sample and adequately decode the downlink signal for the subject terminal.

On the other hand, the received SINR at user terminal UE 1 is higher than at user terminal UE 2, and therefore the downlink signal for user terminal UE 1 is transmitted with smaller transmission power than the downlink signal for user terminal UE 2. Consequently, user terminal UE 2 can ignore the interference by the downlink signal for user terminal UE 1 and does not need to cancel the interference by SIC.

In this way, when NOMA is applied to the downlink, a plurality of user terminals UE 1 and UE 2 with varying received SINRs can be multiplexed over the same radio resource, so that the spectral efficiency can be improved. Meanwhile, a significant increase in traffic is anticipated in a future radio communication system, and therefore further improvement of spectral efficiency is expected. So, a study is being conducted on applying multiple-input and multiple-output (MIMO), in addition to NOMA, to the downlink.

Figure 3:
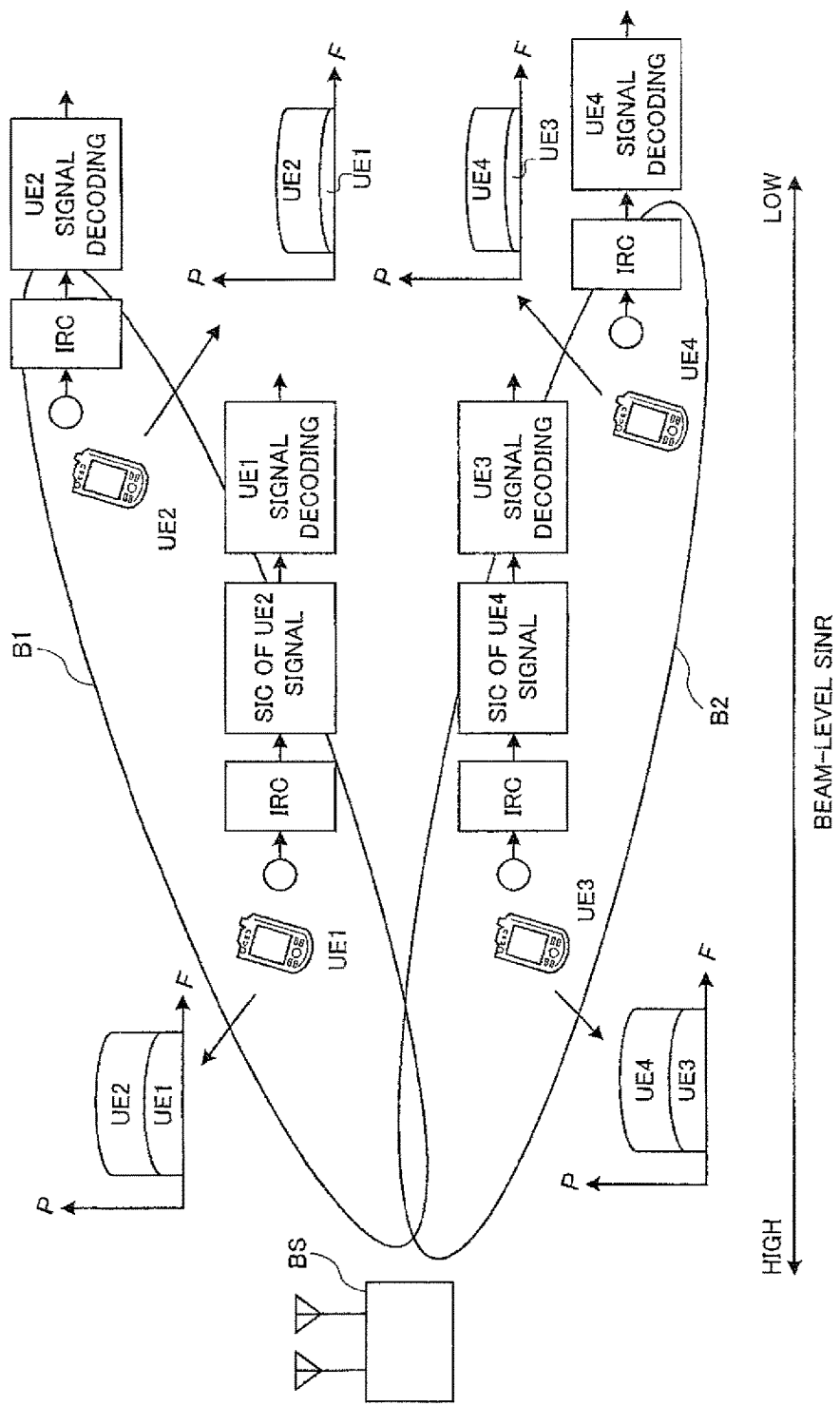
FIG. 3 is a diagram to explain downlink NOMA/MIMO.

FIG. 3 is a diagram to explain a transmission method that employs NOMA and multiple-user multiple-input and multiple-output (MU-MIMO) (hereinafter "NOMA/MU-MIMO") on the downlink. In FIG. 3, user terminals UE 1 and UE 2 are located in locations which are in the same direction from the radio base station BS and which have varying received SINR (beam level SINR). Similarly, user terminals UE 3 and UE 4 are located in locations which are in the same direction from the radio base station BS and which have varying received SINRs.

In NOMA/MU-MIMO, downlink signals for a plurality of user terminals UE are transmitted by a plurality of beams with varying directivities. Also, in each beam, downlink signals for a plurality of user terminals UE which have different received SINRs are transmitted. Meanwhile, on the receiving side, the beam for the subject terminals is sampled by suppressing interference beams by means of IRC (Interference Rejection Combining). Also, the downlink signal for the subject terminal is sampled by cancelling interference signals from the sampled beam by means of SIC.

For example, in FIG. 3, the radio base station BS transmits downlink signals for user terminals UE 1 and UE 2 by beam B1. The received SINR at user terminal UE 2 is lower than at user terminal UE 1, and therefore the downlink signal for user terminal UE 2 is transmitted with larger transmission power than the downlink signal for user terminal UE 1. Also, the radio base station BS transmits downlink signals for user terminals UE 3 and UE 4 by beam B2. Since the received SINR at user terminal UE 4 is lower than at user terminal UE 3, the downlink signal for user terminal UE 4 is transmitted with larger transmission power than the downlink signal for user terminal UE 3.

In FIG. 3, user terminals UE 1 and UE 2 suppress interference beams (here, beam B2) by means of IRC, and sample beam B1 for the subject terminals. Also, user terminal UE 1 cancels the downlink signal for user terminal UE 2 by means of SIC, and samples and decodes the downlink signal for user terminal UE 1. Note that, since user terminal UE 2 can ignore the interference from the downlink signal for user terminal UE 1, SIC is omitted.

Similarly, user terminals UE 3 and UE 4 sample beam B2 for the subject terminals by suppressing interference beams (here, beam B1) by means of IRC. Also, user terminal UE 3 cancels the downlink signal for user terminal UE 4 by means of SIC, and samples and decodes the downlink signal for user terminal UE 3. Note that, since user terminal UE 4 can ignore the interference from the downlink signal for user terminal UE 3, SIC is omitted.

In this way, in NOMA/MU-MIMO, different user terminals UE are space-division-multiplexed (SDM) in each of a plurality of beams from the radio base station BS, and, furthermore, user terminals UE with varying received SINRs are non-orthogonal-multiplexed (NOM) in the same beam. Consequently, it becomes possible to multiplex more user terminals UE over the same radio resource, so that spectral efficiency improves.

As described above, when NOMA/MU-MIMO is employed on the downlink, further improvement of spectral efficiency is anticipated. Meanwhile, a radio communication system which applies NOMA/MU-MIMO is also expected to support transmission methods other than NOMA/MU-MIMO depending on various conditions.

With reference to FIG. 4 and FIG. 5, various transmission methods that should be supported in a radio communication system that applies NOMA/MU-MIMO will be explained. Note that, although cases will be illustrated with FIG. 4 and FIG. 5 where each radio base station BS has two transmitting antennas, the number of transmitting antenna is by no means limited to this.

FIG. 4A shows NOMA/MU-MIMO. As described above, in NOMA/MU-MIMO, downlink signals for different user terminals UE are spatially multiplexed in a plurality of beams that are transmitted from a radio base station BS. Also, in the same beam, downlink signals for a plurality of user terminals UE are non-orthogonal-multiplexed. In NOMA/MU-MIMO, spectral efficiency improves.

Also, in FIG. 4B, a transmission method to employ NOMA and single-user multiple-input and multiple-output (SU-MIMO) (hereinafter abbreviated as "NOMA/SU-MIMO") is shown. In NOMA/SU-MIMO, as shown in FIG. 4B, downlink signals for the same user terminal UE are spatially multiplexed in a plurality of beams that are transmitted from a radio base station BS. Also, in the same beam, downlink signals for a plurality of user terminals UE are non-orthogonal-multiplexed. In NOMA/SU-MIMO, downlink signals for the same user terminal UE are transmitted by a plurality of beams (layers), so that the peak rate improves.

Also, in FIG. 4C, a transmission method that employs NOMA and transmit diversity (hereinafter abbreviated as "NOMA/transmit diversity") is shown. Unlike FIG. 4B, in NOMA/transmit diversity, downlink signals for a plurality of user terminals UE are non-orthogonal-multiplexed and transmitted without using a plurality of beams. To be more specific, downlink signals for a plurality of user terminals UE are space-time-encoded using STBC (Space-Time Block Coding), STTC (Space-Time Trellis Coding) and so on, and transmitted with different transmission power. NOMA/transmit diversity is effective in an environment in which the pre-coding gain by MIMO is small.

Note that transmit diversity may include closed-loop (CL) transmit diversity, which uses feedback information from user terminals UE, and open-loop (OL) transmit diversity, which does not use feedback information from user terminals UE.

Also, on the assumption that a plurality of user terminals UE to be subject to non-orthogonal-multiplexing are not present, as shown in FIG. 5, transmission methods that are not premised upon NOMA are also expected to be supported.

Figure 5A:
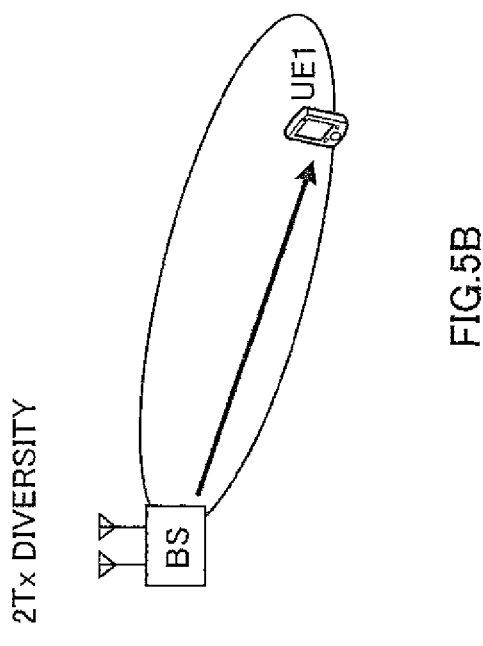
FIG. 5 provides diagrams to explain transmission methods not employing NOMA, according to the first example of the present invention.

In FIG. 5A, a transmission method to employ SU-MIMO without using NOMA (hereinafter abbreviated as "SU-MIMO") is shown. In SU-MIMO, as shown in FIG. 5A, downlink signals for a single user terminal UE are spatially multiplexed in a plurality of beams that are transmitted from a radio base station BS. SU-MIMO is effective when there is no other user terminal UE to be subject to NOMA.

Figure 5B:
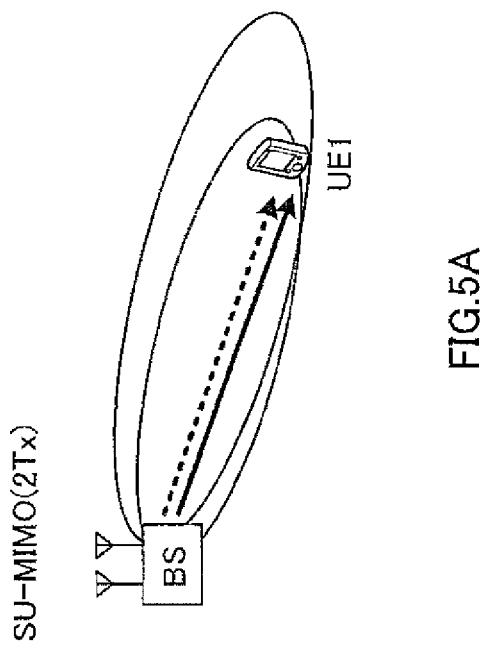

In FIG. 5B, a transmission method to employ either closed-loop (CL) transmit diversity or open-loop (OL) transmit diversity is shown. In CL transmit diversity or OL transmit diversity, as shown in FIG. 5B, a downlink signal for a single user terminal UE is space-time-encoded using STBC, STTC and so on, and transmitted. CL transmit diversity, OL transmit diversity and so on are effective in an environment where no other user terminal UE to be subject to NOMA is present and the pre-coding gain by MIMO is small.

As described above, a radio communication system that applies NOMA/MU-MIMO to the downlink is expected to support various transmission methods, such as transmission methods that are premised upon NOMA (for example, NOMA/MU-MIMO, NOMA/SU-MIMO, NOMA/CL transmit diversity and NOMA/OL transmit diversity), transmission methods that are not premised upon NOMA (for example, SU-MIMO, CL transmit diversity and OL transmit diversity) and so on.

However, there is a threat of increasing the control load when a radio communication system that applies NOMA/MU-MIMO to the downlink attempts to support various transmission methods dynamically. So, the present inventors have come up with the idea of supporting various transmission methods, without increasing the control load, by defining transmission modes that group a plurality of transmission methods, and made the present invention.

Now, a radio communication method according to the present invention will be described below in detail. Note that radio communication methods according to a first example and a second example of the present invention below can either be used independently or be used in combination as appropriate. Also, in the following, the interference estimate information may be any information that indicates the amount of interference and channel quality in a user terminal UE such as the received SINR, the path loss, a CQI (Channel Quality Indicator), the SNR, CSI (Channel State Information) and so on.

First Example

In a radio communication method according to the first example, for a user terminal UE, a radio base station BS configures one of a plurality of transmission modes including a first transmission mode, which groups a plurality of transmission methods including NOMA/MU-MIMO, and a second transmission mode, which groups a plurality of transmission methods including NOMA/OL transmit diversity. The radio base station BS transmits a downlink signal based on the transmission mode that is configured. The user terminal UE performs receiving processes (for example, demodulation, decoding and so on) of the downlink signal, based on transmission mode information to indicate the configured transmission mode.

Here, a plurality of transmission methods that are grouped in the first transmission mode may include, in addition to NOMA/MIMO above, at least one of CL transmit diversity (which does not employ NOMA, and which may also be referred to as "single-user CL transmit diversity"), SU-MIMO (which does not employ NOMA), NOMA/CL transmit diversity and NOMA/SU-MIMO.

Also, a plurality of transmission methods that are grouped in the second transmission mode may include, in addition to NOMA/OL transmit diversity above, at least one of OL transmit diversity (which does not employ NOMA, and which may also be referred to as "single-user OL transmit diversity), SU-MIMO (which does not employ NOMA), NOMA/OL transmit diversity and NOMA/SU-MIMO.

Note that the transmission methods that are grouped in each of the first transmission mode and the second transmission mode are by no means limited to the above. Furthermore, the distinction between the first transmission mode and the second transmission mode is also by no means limited to the above. For example, the transmission methods of the first transmission mode and the second transmission mode may be grouped depending on whether or not the transmission methods require feedback information from user terminals UE. Also, the transmission methods of the first transmission mode and the second transmission mode may be grouped depending on whether the transmission methods involve MIMO or transmit diversity.

In the radio communication method according to the first example, the radio base station BS may configure one of a plurality of transmission modes for a user terminal UE based on interference estimate information from the user terminal UE. Also, the radio base station BS may switch the transmission mode to configure for a user terminal UE based on interference estimate information from the user terminal UE. Note that it is equally possible to configure or switch the transmission mode by using higher layer signaling (for example, RRC signaling). This makes it possible to switch the transmission mode semi-statically.

Also, the radio base station BS may configure the transmission mode to apply to a downlink signal for a user terminal UE, based on interference estimate information from the user terminal UE, from a plurality of transmission methods that are grouped in the configured transmission mode. Furthermore, in the configured transmission mode, the radio base station BS may switch the transmission method to apply to a downlink signal for a user terminal UE based on interference estimate information from the user terminal UE. Note that the transmission method may be configured or switched by using signaling of a lower layer (for example, MAC signaling) than higher layer signaling, a L1/L2 control channel (for example, a downlink control channel (PDCCH: Physical Downlink Control Channel)) and so on. This makes it possible to dynamically switch between the transmission methods in the transmission mode.

Also, in the radio communication method according to the first example, downlink signals that are transmitted based on the above first transmission mode and second transmission mode may be a downlink shared channel (PDSCH: Physical Downlink Shared Channel).

Here, as PDSCH transmission modes, transmission mode 1 to support a single antenna port, transmission mode 2 to support transmit diversity, transmission mode 3 to support open-loop spatial multiplexing, transmission mode 4 to support closed-loop spatial multiplexing, transmission mode 5 to support MU-MIMO, transmission mode 6 to support single-layer closed-loop spatial multiplexing, transmission mode 7 to 9 to support layer transmission using user terminal UE-specific reference signals (for example, DM-RSs: Demodulation Reference Signals), transmission mode 10 to support CoMP (Coordinated Multipoint Transmission) and so on are defined.

So, PDSCH transmission by NOMA/MIMO may be realized by adding the above first transmission mode and second transmission mode as PDSCH transmission modes. In this case, for example, the above first transmission mode and second transmission mode may be defined as transmission modes 11 and 12, respectively.

Also, in the radio communication method according to the first example, in each transmission method that is grouped in the first transmission mode or the second transmission mode, reference signals that are common between user terminals UE and/or are orthogonal between layers (beams) may be transmitted from the radio base station BS. With reference to FIG. 6, reference signals that are used to demodulate downlink signals that are transmitted in each transmission method (hereinafter referred to as "demodulation reference signals") will be explained. Note that, in FIG. 6, the horizontal axis is radio resources (time and frequency), and the vertical axis is transmission power. Also, in FIG. 6, although demodulation reference signals are placed over two consecutive resource elements, this is by no means limiting.

Figure 6A:
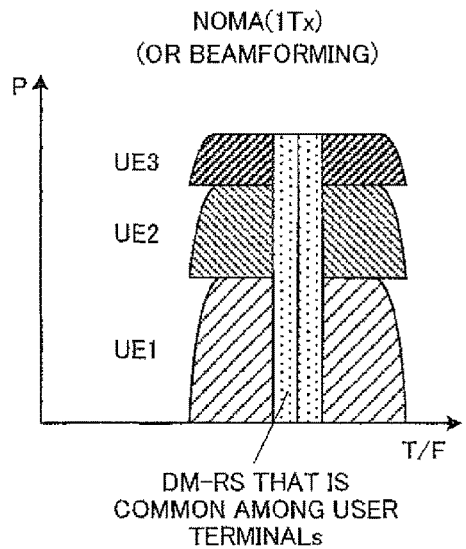
FIG. 6 provides diagrams to show example structures of demodulation reference signals according to the first example of the present invention.

As shown in FIG. 6A, in a transmission method to employ NOMA by one transmitting antenna (1Tx), downlink signals for user terminals UE (here, user terminals UE 1 to UE 3) are transmitted using the same radio resources, with different transmission power. In this case, a DM-RS (Demodulation Reference Signal) that is common among the user terminals UE can be used as a demodulation reference signal.

Figure 6B:
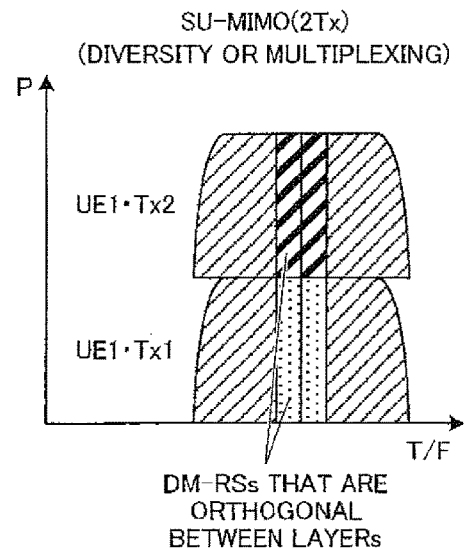

Also, as shown in FIG. 6B, in SU-MIMO by a plurality of transmitting antennas (here, antennas Tx 1 and Tx 2), downlink signals in a plurality of (two) layers for a single user terminal UE (here, user terminal UE 1) are multiplexed over the same radio resources. In this case, for example, DM-RSs that are orthogonal between the layers can be used as demodulation reference signals.

Figure 6C:
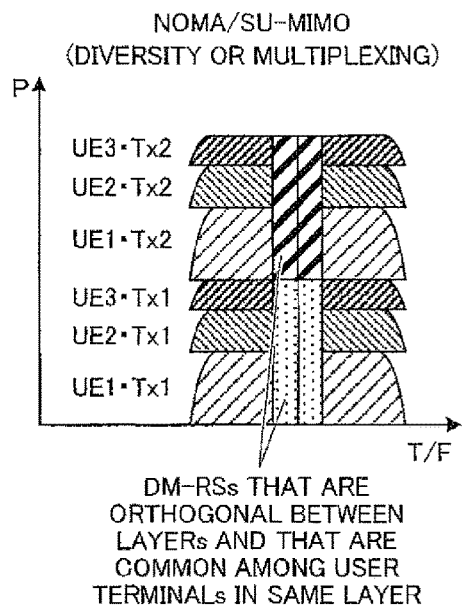

Also, as shown in FIG. 6C, in NOMA/SU-MIMO by a plurality of transmitting antennas (here, antennas Tx 1 and Tx 2), downlink signals in a plurality of (two) layers for user terminals UE (here, user terminals UE 1 to UE 3) are multiplexed over the same radio resources. Here, the downlink signals for the user terminals UE are transmitted with different transmission power. In this case, for example, DM-RSs that are common among the user terminals UE in the same layer and that are orthogonal between the layers can be used as demodulation reference signals.

Figure 6D:
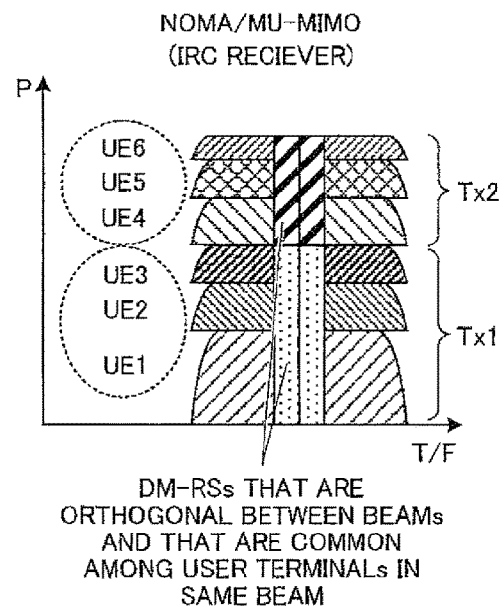

Also, as shown in FIG. 6D, in NOMA/MU-MIMO by a plurality of transmitting antennas (here, transmitting antennas Tx 1 and Tx 2), downlink signals for user terminals UE (here, user terminals UE 1 to 6) are multiplexed over the same radio resources. In the same layer (beam), downlink signals for user terminals UE are transmitted with different transmission power. In this case, for example, DM-RSs that are common among the user terminals UE in the same layer (beam) and that are orthogonal between the layers (beams) can be used as demodulation reference signals.

When a demodulation reference signal that is common between user terminals UE is used in this way, the transmission power ratio of downlink signals for the user terminals UE may be reported from a radio base station BS. By this means, even when a common demodulation reference signals is employed, each user terminal UE can adequately demodulate the downlink signal for the subject terminal. Note that, although cases have been shown with FIG. 6 where demodulation reference signals that are common among user terminals UE are used, it is equally possible to use demodulation reference signals that are user terminal UE-specific.

With the above radio communication method according to the first example, transmission modes to support NOMA/MU-MIMO are defined in a radio communication system which can use non-orthogonal multiple access (NOMA), so that spectral efficiency can be improved. The first transmission mode to group a plurality of transmission methods including NOMA/MU-MIMO and the second transmission mode to group a plurality of transmission methods including NOMA/open-loop transmit diversity are defined, so that it is possible to support various transmission methods, without increasing the control load.

Second Example

In a radio communication method according to the second example, the method of transmitting the reference signals that are used to estimate interference in user terminals UE (hereinafter referred to as "estimation reference signals") will be explained in detail.

With reference to FIG. 7 and FIG. 8, closed-loop (CL)-type beamforming and open-loop (OL)-type beamforming will be described. FIG. 7 provides diagrams to explain CL-type beamforming. FIG. 8 provides diagrams to explain OL-type beamforming. Note that OL-type beamforming may be referred to as "random beamforming," "opportunistic beamforming" and so on.

As shown in FIG. 7A, in CL-type beamforming, at time T-$\Delta$, a user terminal UE that is connected to radio base station BS 1 estimates the amount of interference from radio base station BS 2, based on a beamforming matrix $M_2(T-\Delta)$ from radio base station BS 2. To radio base station BS 1, the user terminal UE feeds back interference estimate information (for example, the SINR) to indicate the estimated amount of interference and a beamforming matrix $M_1(T)$ that matches this interference estimate information.

As shown in FIG. 7B, at time T, radio base station BS 1 transmits the beamforming matrix $M_1(T)$, which is fed back from the user terminal UE, by multiplying over a channel matrix $H_1$. Here, at time T, the user terminal UE does not know the beamforming matrix $M_2(T)$ from radio base station BS 2. In CL-type beamforming, generally, the beamforming matrices $M_2(T-\Delta)$ and $M_2(T)$ that are used in a radio base station BS at time T-$\Delta$ and at time T vary, depending on the result of scheduling and so on. Consequently, there is a threat that an error may be produced between the estimation results of the amount of interference at time T-Δ and time T.

On the other hand, in OL-type beamforming, each radio base station BS transmits a predetermined beamforming matrix M or a random beamforming matrix M at each time point, by multiplying over a channel matrix H. That is, in OL-type beamforming, a known beamforming matrix M is employed instead of a beamforming matrix M that is fed back from the user terminal UE.

So, in OL-type beamforming, at time T-Δ, by employing the beamforming matrix M(T) at time T, which comes after time T-Δ, it may be possible to reduce the error between the estimation results of the amount of interference at time T-Δ and time T.

Figure 8B:
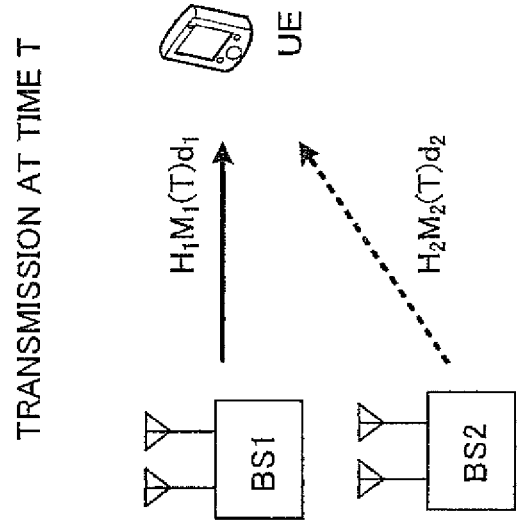
FIG. 8 provides diagrams to explain open-loop beamforming.
Figure 8A:
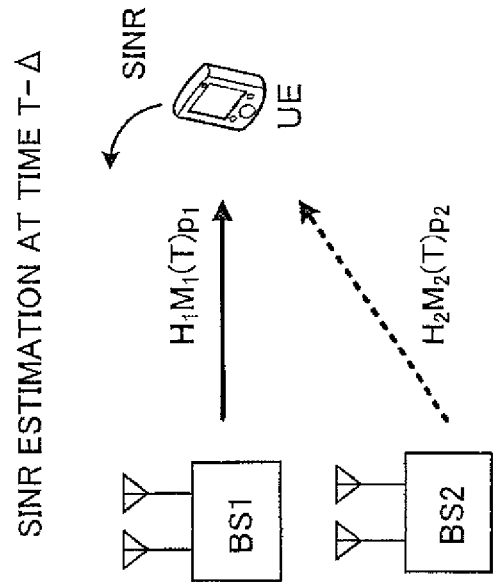

For example, in FIG. 8A, radio base stations BS 1 and BS 2 transmit the beamforming matrices $M_1(T)$ and $M_2(T)$ at time T, by multiplying over channel matrices $H_1$ and $H_2$, respectively. The user terminal UE, which is connected to radio base station BS 1, estimates the amount of interference from radio base station BS 2 based on the beamforming matrix $M_2(T)$ at time T. The user terminal UE feeds back interference estimate information to indicate the estimated amount of interference (for example, the SINR) to radio base station BS 1.

Also, as shown in FIG. 8B, radio base station BS 1 performs scheduling based on interference estimate information that has been fed back from the user terminal UE. In this way, at time T-Δ, by employing the beamforming matrix $M_2(T)$ at time T, which comes after time T-Δ, it is possible to reduce the error between the estimation results of the amount of interference at time T-Δ and time T.

As described above, in the radio communication method according to the second example, instead of using the beamforming matrices $M_1(T-\Delta)$ and $M_2(T-\Delta)$ at time (T-Δ) (first time), at which an estimation reference signal is transmitted, each radio base station BS uses the beamforming matrices $M_1(T)$ and $M_2(T)$ at time T (second time), at which a downlink signal is transmitted based on the interference estimate information by this estimation reference signal and transmits this estimation reference signal. This makes it possible to reduce the estimation error in the amount of interference in the user terminal UE.

Here, interference estimate information, which is estimated at a user terminal UE, will be described in detail. Note that, although interference estimate information is the SINR in the following, this is by no means limiting.

A received signal vector y at a user terminal UE that is connected to radio base station BS 1 is represented by following equation 1.

$$y = \sum_{b=1}^{B} H_1 m_{1,b} x_{1,b} + \sum_{k=2}^{K}\sum_{b=1}^{B} H_k m_{k,b} x_{k,b} + w \quad \text{(Equation 1)}$$

$$\|m_{k,b}\| = 1, \; E[|x_{k,b}|^2] = P_{k,b}, \; \forall k, b, \; w \sim CN(0, N_0 I)$$

Here, $H_1 m_{1,b}$ is the received signal (that is, a desired signal) by the b-th beam from the first radio base station BS (radio base station to which the user terminal UE is connected). Also, $H_k m_{k,b}$ is the received signal (that is, an interference signal) by the b-th beam from the k-th radio base station BS. Also, W is noise. Also, $M_{k,b}$ is the beamforming matrix of the b-th beam from the k-th radio base station BS.

Also, when $V_{1,b}$ ($\|V_{1,b}\|=1$) is the receiving filter vector when the b-th beam (1, b) from the first radio base station BS is received, the received SINR of the b-th beam (1, b) is represented by following equation 2.

$$SINR_{1,b} = \frac{|v_{1,b}^H H_1 m_{1,b}|^2 P_{1,b}}{\sum_{b'=1,b'\neq b}^{B} |v_{1,b}^H H_1 m_{1,b'}|^2 P_{1,b'} + \sum_{k=2}^{K}\sum_{b'=1}^{B} |v_{1,b}^H H_k m_{k,b'}|^2 P_{k,b'} + N_0} \quad \text{(Equation 2)}$$

$$= \frac{R_{1,b}}{\sum_{\substack{k,b' \\ (k,b')\neq(1,b)}} R_{k,b'} + N_0}$$

$$R_{k,b'} = |v_{1,b}^H H_k m_{k,b'}|^2 P_{k,b'}$$

Here, $R_{1,b}$ (that is, desired signal power) is the received signal power by the b-th beam from the first radio base station BS. Also, $R_{k,b'}$ (that is, interference signal power) is the received signal power by the b'-th beam from the k-th radio base station BS. Also, $N_0$ is noise power.

Now, when an estimation reference signal that is beamformed using the beamforming matrix M(T) at time T, which comes after time T-Δ, is transmitted (with reference to FIG. 8), to which radio resource this estimation reference signal is placed (mapped) is the problem.

Figure 9:
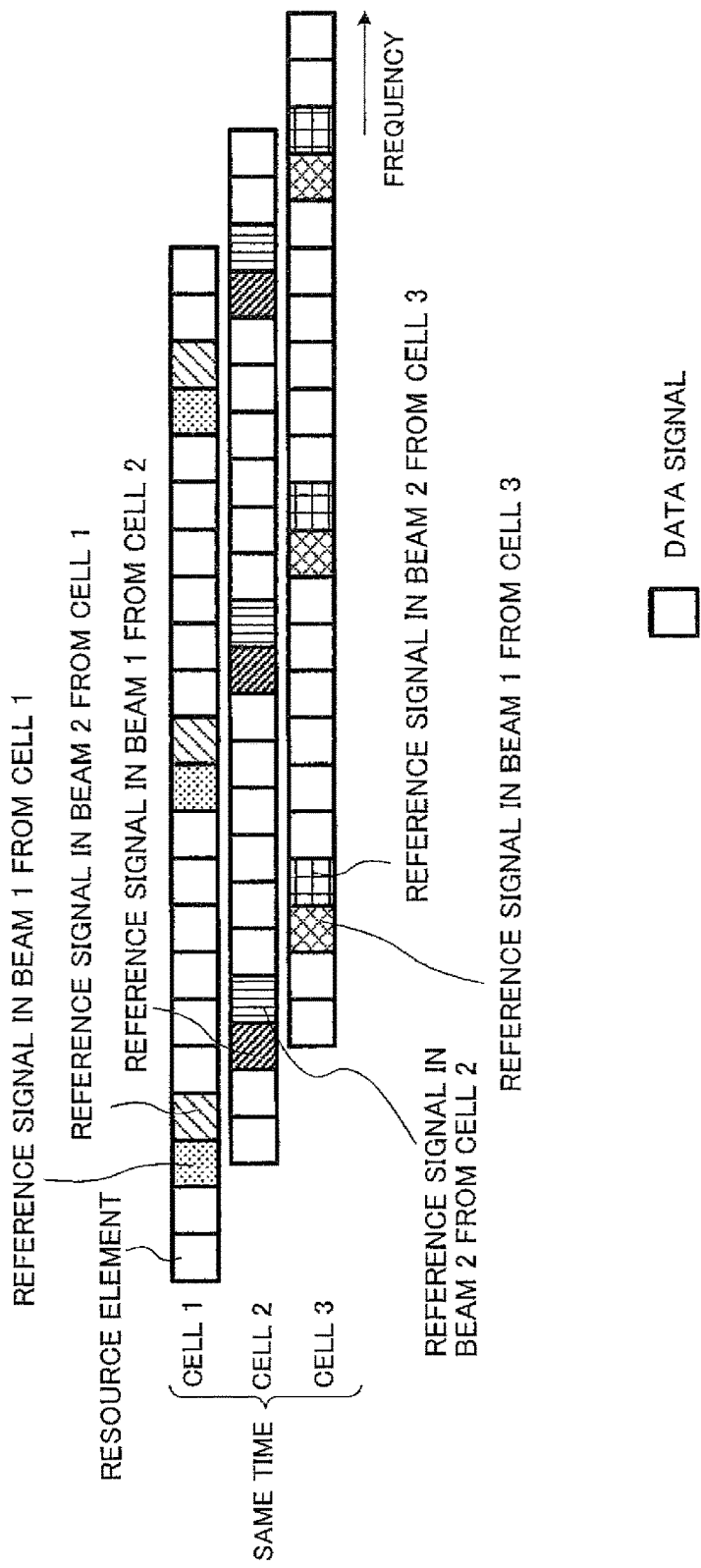
FIG. 9 is a diagram top show an example of mapping of estimation reference signals.

FIG. 9 is a diagram to explain an example of arrangement of estimation reference signals. For example, in FIG. 9, estimation reference signals that are transmitted from radio base stations BS 1 to BS 3 (cells 1 to 3) are mapped to resource elements that do not collide each other. Also, in each radio base station BS (cell), estimation reference signal that are transmitted by different beams are mapped to different resource elements. In this way, in FIG. 9, estimation reference signals that are used to estimate each beam's interference estimate information (channel estimation) are arranged to be orthogonal in the cells and not to collide among the cells.

Also, in FIG. 9, the estimation reference signals from the subject cell is mapped to collide with data signals from other cells. This is because performing complete orthogonalization, which does not place the data signals for other cells in locations where the estimation reference signals for the subject cell are placed, entails significant overhead. Note that, the beamforming to apply to the data signals from other cells is different from the estimation reference signals from the subject cell, so that a user terminal UE can distinguish the estimation reference signals from the subject cell and the data signals from other cells.

Also, in FIG. 9, when the estimation reference signal that is mapped to the i (i=1, . . . , L)-th resource element in the b'-th beam (k, b') from the k-th radio base station BS is $p_{k,b',i}$, $y_{k,b'}$ (length L), the received signal vector of this estimation reference signal $p_{k,b',i}$ after receiving filtering, is represented by following equation 3.

$$y_{k,b'} = \begin{bmatrix} \vdots \\ v_{1,b}^H H_k m_{k,b'} p_{k,b',j} + z_{k,b',j} \\ \vdots \end{bmatrix} = \quad \text{(Equation 3)}$$

$$v_{1,b}^H H_k m_{k,b'} p_{k,b'} + z_{k,b'}$$

Here, $\{p_{k,b',i}\}$ is independent. Also, $\|p_{k,b',i}\|^2 = P_{k,b'}$. Also, $p_{k,b'} = [p_{k,b',1}, \ldots, p_{k,b',L}]^T$. Also, because of the interference from the data signals from other cells, $z_{k,b'}$ is taken into account instead of noise power $N_0$. Note that $z_{k,b'}$ is represented by following equation 4.

$$z_{k,b'} \sim CN(0, I_{k,b}I) \quad \text{(Equation 4)}$$

Also, $R_{k,b'}$, the interference signal power by the b'-th beam from the k-th radio base station BS, is represented by following equation 5.

$$\tilde{R}_{k,b'} = \left| \frac{p_{k,b'}^H}{\sqrt{L} \|p_{k,b'}\|} y_{k,b'} \right|^2 \quad \text{(Equation 5)}$$

$$= \left| \frac{1}{\sqrt{L}} v_{1,b}^H H_k m_{k,b'} \|p_{k,b'}\| + \frac{p_{k,b'}^H}{\sqrt{L} \|p_{k,b'}\|} z_{k,b'} \right|^2$$

$$= \left| v_{1,b}^H H_k m_{k,b'} \sqrt{P_{k,b'}} + \frac{p_{k,b'}^H}{\sqrt{L} \|p_{k,b'}\|} z_{k,b'} \right|^2$$

$$\approx |v_{1,b}^H H_k m_{k,b'}|^2 P_{k,b'} \quad \overline{\sim CN(0, I_{k,b'}/L)}$$

However, when estimation reference signals are placed to be orthogonal in the cells and not to collide among the cells as shown in FIG. 9, the following problems arise. First, a radio base station BS needs to know the radio resources (resource elements) where the estimation reference signals are placed in peripheral cells and these estimation reference signal sequences. Second, the estimation value of interference signal power $R_{k,b'}$ from a distant peripheral cell contains a large error. Third, the interference from the data signals for the peripheral cells is included in the estimation reference signals, and therefore it becomes difficult to measure noise power $N_0$.

Figure 10:
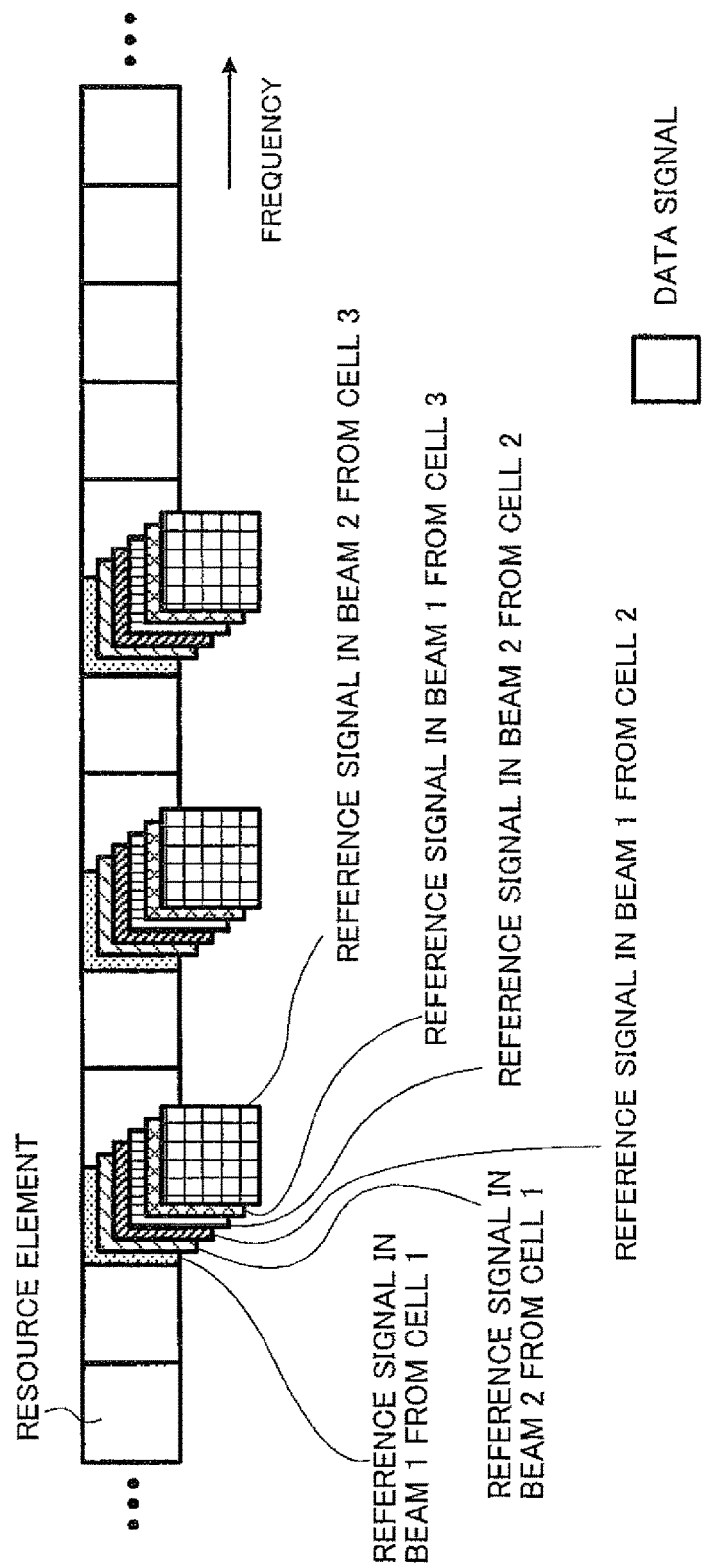
FIG. 10 is a diagram to show an example of mapping of estimation reference signals according to a second example of the present invention.

So, in the radio communication method acceding to the second example, the above problems are solved by placing the estimation reference signals in all beams from all cells to the same radio resources as shown in FIG. 10. FIG. 10 is a diagram to explain an example of arrangement of estimation reference signals in the radio communication method according to the second example.

For example, in FIG. 10, the estimation reference signals in all beams from all of radio base stations BS 1 to 3 (cells 1 to 3) are mapped to the same resource elements. In FIG. 10, the estimation reference signals in all beams from all radio base stations BS are code-division-multiplexed over the same resource elements. CAZAC (Constant Amplitude Zero Auto-Correlation) sequences, WALSH code and so on may be employed in this code-division-multiplexing. Note that the arrangement shown in FIG. 10 is based on the premise that radio base stations BS 1 to 3 are all synchronized (inter-cell synchronization).

In FIG. 10, when the estimation reference signal that is mapped to the i ($i=1, \ldots, F$)-th resource element in the b'-th beam from the k-th radio base station BS is $q_{k,b',i}$, $y_{OL}$ (length F), the receiving signal vector of this estimation reference signal $q_{k,b',i}$ after receiving filtering, is represented by following equation 6.

$$y_{OL} = \begin{bmatrix} \vdots \\ \sum_{k,b'} v_{1,b}^H H_k m_{k,b'} q_{k,b',j} + \tilde{w}_i \\ \vdots \end{bmatrix} = \quad \text{(Equation 6)}$$

-continued
$$\sum_{k,b'} v_{1,b}^H H_k m_{k,b'} q_{k,b'} + \tilde{w}$$

Here, $\{q_{k,b',i}\}$ is independent. Also, $E_i[q_{k,b',i}]=0$. Also, $\|q_{k,b',i}\|^2 = P_{k,b'}$. Also, $q_{k,b'} = [q_{k,b',1}, \ldots, q_{k,b',F}]^T$.
Also, the relationship of following equation 7 holds.

$$\tilde{w} \sim CN(0, N_0 I) \quad \text{(Equation 7)}$$

In FIG. 10, when $q_{k,b',i}$ is designed to be average zero between i's and independent among k, b and i (substantially orthogonal), if F is large enough, the sum of total receiving power of estimation reference signals that have been multiplexed over the same resource element and noise power $N_0$ is represented by following equation 8.

$$\frac{1}{F} \|y_{OL}\|^2 \approx P_{RX} = \quad \text{(Equation 8)}$$

$$\sum_{k,b'} |v_{1,b}^H H_k m_{k,b'}|^2 P_{k,b'} + N_0 = \sum_{k,b'} R_{k,b'} + N_0$$

In the radio communication method according to the second example, when estimation reference signals that are beam-formed using the beamforming matrix M at time T, which comes after time T-Δ, and then multiplexed over the same radio resources as shown in FIG. 10 are employed, a user terminal UE estimates interference estimate information based on these estimation reference signals (performs channel estimation). In this case, the user terminal UE may estimate the interference estimate information (for example, the SINR) based on these estimation reference signals and legacy reference signals.

(1) When the SINR is Estimated by Using Legacy Reference Signals

In this case, a user terminal UE may estimate the desired signal power based on the legacy reference signals and estimate the interference signal power based on the above estimation reference signals. As the legacy reference signals, for example, CSI-RSs (Channel State Information-Reference Signals) and so on may be employed. $SINR_{1,b}$ of the b-th beam from the first radio base station BS is represented by following equation 9.

$$SINR_{1,b} = \frac{R_{1,b}}{\sum_{\substack{k,b' \\ (k,b') \neq (1,b)}} R_{k,b'} + N_0} \quad \text{(Equation 9)}$$

$$= \frac{R_{1,b}}{\sum_{k,b'} R_{k,b'} + N_0 - R_{1,b}}$$

$$\approx \frac{\left| \frac{p_{1,b}^H}{\sqrt{L} \|p_{1,b}\|} y_{1,b} \right|^2}{\frac{1}{F} \|y_{OL}\|^2 - \left| \frac{p_{1,b}^H}{\sqrt{L} \|p_{1,b}\|} y_{1,b} \right|^2}$$

In the numerators of equation 9, the desired signal power of a legacy reference signal (for example, a CSI-RS) is represented. Also, in the denominators of equation 9, the desired signal power of the legacy reference signal is subtracted from the sum of the total receiving power of the estimation reference signals that are multiplexed over the same resource element, and noise power $N_0$. By this means, it is possible to estimate the SINR based on estimation reference signals that are multiplexed over the same resource as shown in FIG. 10 and legacy reference signals.

(2) When the SINR is Estimated without Using Legacy Signals

In this case, a user terminal UE may estimate both the desired signal power and the interference signal power based on the above estimation reference signals. The desired signal power that is estimated based on an estimation reference signal is represented by equation 10.

$$\tilde{R}_{1,b} = \left| \frac{q_{1,b}^H}{\sqrt{F} \|q_{1,b}\|} y_{OL} \right|^2 \quad \text{(Equation 10)}$$

Alternatively, the desired signal power that is estimated based on the estimation reference signal may be represented by equation 11. Note that equation 11 assumes that a user terminal knows at least one of the estimation reference signals $q_{k,b}$'s in the b'-th beam from the k-th radio base station BS in advance. In this case, using a decorrelator is also possible.

$$y_{OL} = \sum_{k,b'} v_{1,b}^H H_k m_{k,b'} q_{k,b'} + \tilde{w} = \quad \text{(Equation 11)}$$

$$[q_{1,1} \quad \cdots \quad q_{1,B} \quad q_{2,1} \quad \cdots \quad q_{K,B}] \begin{bmatrix} v_{1,b}^H H_1 m_{1,1} \\ \vdots \\ v_{1,b}^H H_1 m_{K,B} \end{bmatrix} + \tilde{w}$$

$$\tilde{R}_{1,b} = |[[q_{1,1} \quad \cdots \quad q_{1,B} \quad q_{2,1} \quad \cdots \quad q_{K,B}]^- y_{OL}]_b|^2 P_{1,b}$$

Figure 11:
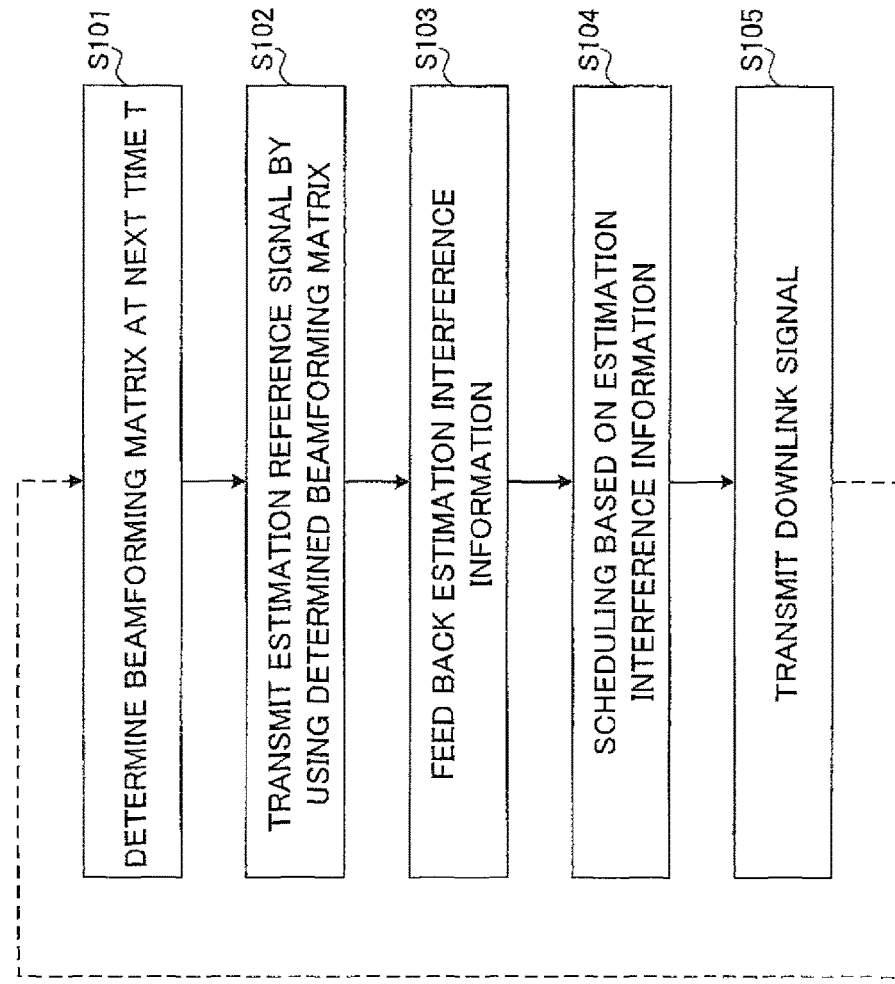
FIG. 11 is a flow chart to show a radio communication method according to the second example of the present invention.

With reference to FIG. 11, the operation of the radio communication method according to the second example will be explained in detail. FIG. 11 is a flow chart to show the radio communication method according to the second example. The operation of radio base station BS 1 and a user terminal UE that is connected to this radio base station BS 1 will be mainly explained below. Note that, according to FIG. 11, an estimation reference signal is beam-formed (pre-coded) by OL-type beamforming and transmitted.

In step S101 in FIG. 11, radio base station BS 1 determines the beamforming matrix $M_1(T)$ (pre-coding matrix) to use to transmit a downlink signal (for example, PDSCH) at time T (second time), which comes after time T-Δ (first time), in advance. Here, the beamforming matrix at time T may be either determined in advance or may be picked up randomly.

In step S102, at time T-Δ, radio base station BS 1 pre-codes and transmits as many estimation reference signals as the number of beams (streams and layers), by using the beamforming matrix $M_1(T)$ of next time T. Similarly, each radio base station BS in peripheral cell also pre-codes and transmits as many reference signals as the number of beams (streams and layers), by using the beamforming matrix M(T) of next time T.

Also, in step S102, radio base station BS 1 maps estimation reference signals in all beams from the subject station to the same radio resources with estimation reference signals in all beams from peripheral cells as shown in FIG. 10. By this means, it is possible to improve the accuracy of the estimation of the amount of interference compared to when the estimation reference signals from the subject station are mapped to be orthogonal in the cells and not to collide among the cells as shown in FIG. 9.

In step S103, the user terminal UE performs interference estimation (channel estimation) for each beam from radio base station BS 1, and feeds back interference estimate information (for example, the SINR) of each beam (stream and layer) to radio base station BS 1. Here, the user terminal UE may estimate the SINR based on legacy reference signals (for example, CSI-RS) and the above estimation reference signals as shown in equation 9. Alternatively, as shown in equation 11, the user terminal UE may estimate the SINR based on the estimation reference signals above, without using legacy reference signals.

In step S104, radio base station BS 1 schedules a user terminal UE that is appropriate for each beam (a stream and a layer) based on interference estimation information of each beam that is fed back from the user terminal UE. For example, the user terminal UE with the highest SINR in each beam is selected and allocated to each beam by radio base station BS 1.

In step S105, radio base station BS 1 pre-codes and transmits the downlink signal (for example, the PDSCH) at present time T, based on the scheduling result in step S104.

Note that, in step S105, the downlink signal may be transmitted based on the transmission mode that is configured for the user terminal UE in the radio communication method according to the first example. Also, this transmission mode may be switched semi-statically based on the interference estimate information that is fed back in step S103. Also, a plurality of transmission methods that are supported by the transmission mode may be switched dynamically based on the interference estimate information that is fed back in step S103.

With the above radio communication method according to the second example, an estimation reference signal is beam-formed by using the beamforming matrices $M_1(T)$ and $M_2(T)$ at time T, at which a downlink signal is transmitted, based on the estimation reference signal, and multiplexed over the same radio resource with estimation reference signals in all beams from peripheral cells and transmitted, therefore it is possible to improve the accuracy of the interference estimation information.

The above radio communication method according to the second example is a radio communication method in a radio communication system in which a radio base station BS transmits a downlink signal for a user terminal UE, and has, in the radio base station BS, the steps of, mapping an estimation reference signal that is used to estimate interference estimate information at the user terminal UE to the same radio resources as peripheral radio base stations, and instead of using the beamforming matrix at time the first time, at which an estimation reference signal is transmitted, by using the beamforming matrix at the second time, at which a downlink signal is transmitted based on the interference estimate information by this estimation reference signal, transmitting this estimation reference signal.

(Structure of Radio Communication System)

Now, a structure of a radio communication system according to the present embodiment will be described. In this radio communication system, the above radio communication methods (including the first example and the second example) are applied. With reference to FIG. 12 to FIG. 15, a schematic structure of a radio communication system according to the present embodiment will be described.

Figure 12:
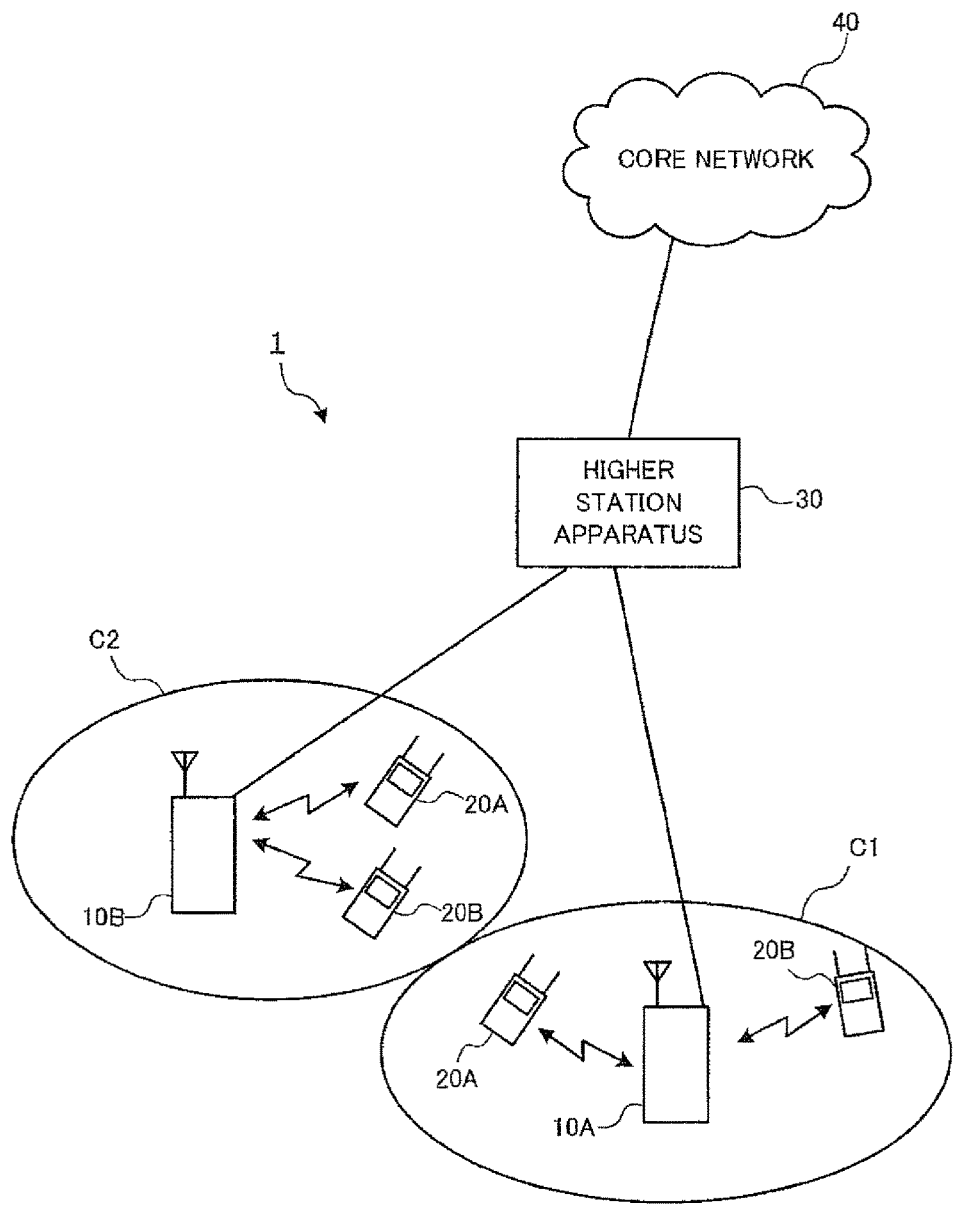
FIG. 12 is a schematic diagram of a radio communication system according to the present embodiment.

As shown in FIG. 12, the radio communication system 1 includes radio base stations 10 (10A and 10B) and a plurality of user terminals 20 (20A and 20B). The radio base stations 10 are connected with a higher station apparatus 30, and this higher station apparatus 30 is connected with a core network 40. Each user terminal 20 can communicate with the radio base stations 10 in cells C1 and C2. In this radio communication system 1, the user terminals 20 may be mobile terminals or may be fixed terminals. Note that the higher station apparatus 30 may be, for example, an access gateway apparatus, a radio network controller (RNC), a mobility management entity (MME) and so on, but is by no means limited to these.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands. To the downlink of this radio communication system 1, NOMA is applied as necessary.

Here, communication channels to be used in the radio communication system 1 shown in FIG. 12 will be described. Downlink communication channels include a PDSCH (Physical Downlink Shared CHannel), which is used by each user terminal 20 on a shared basis, and downlink L1/L2 control channels (a PDCCH, a PCFICH, a PHICH and an EPDCCH). User data and higher control information are transmitted by the PDSCH. Scheduling information for the PDSCH and the PUSCH and so on is transmitted by the PDCCH (Physical Downlink Control CHannel). The number of OFDM symbols to use for the PDCCH is transmitted by the PCFICH (Physical Control Format Indicator CHannel). HARQ ACKs and NACKs for the PUSCH are transmitted by the PHICH (Physical Hybrid-ARQ Indicator CHannel).

Uplink communication channels include the PUSCH (Physical Uplink Shared CHannel), which is used by each user terminal 20 on a shared basis as an uplink shared channel, and a PUCCH (Physical Uplink Control CHannel), which is an uplink control channel. User data and higher control information are transmitted by this PUSCH. Also, by means of the PUCCH or the PUSCH, downlink interference estimate information (CQI, SINR, etc.), delivery confirmation information (ACKs/NACKs/DTX) and so on are transmitted.

Figure 13:
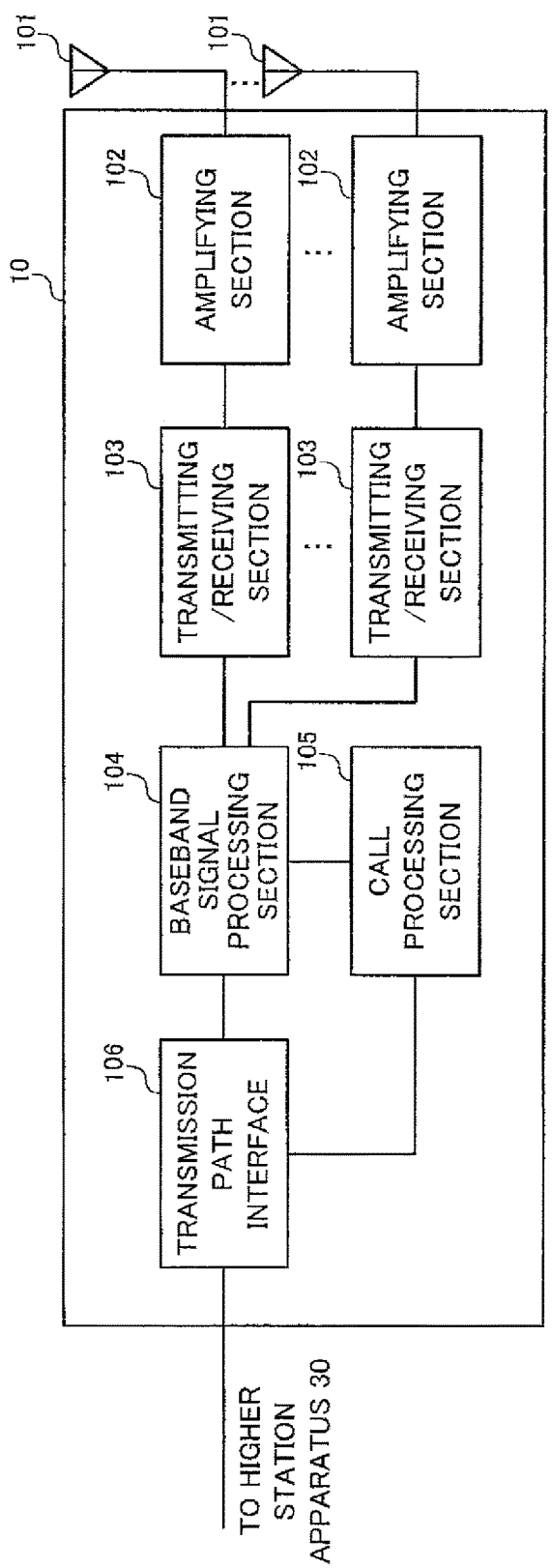
FIG. 13 is a diagram to explain a schematic structure of a radio base station according to the present embodiment.

FIG. 13 is a schematic structure diagram of a radio base station according to the present embodiment. A radio base station 10 has a plurality of transmitting/receiving antennas 101 for beamforming, amplifying sections 102, transmitting/receiving sections 103, a baseband signal processing section 104, a call processing section 105 and a transmission path interface 106.

User data to be transmitted from the radio base station 10 to a user terminal 20 on the downlink is input from the higher station apparatus 30, into the baseband signal processing section 104, via the transmission path interface 106.

In the baseband signal processing section 104, user data that is input is subjected to a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process, and then transferred to each transmitting/receiving section 103. Furthermore, downlink control information is subjected to transmission processes such as channel coding and an IFFT process, and transferred to each transmitting/receiving section 103.

Also, the baseband signal processing section 104 reports control information for communication in the serving cell to the user terminals 20 through a broadcast channel. The information for communication in the serving cell includes, for example, the uplink or downlink system bandwidth.

Each transmitting/receiving section 103 converts the baseband signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, data to be transmitted from the user terminal 20 to the radio base station 10 on the uplink is received in each transmitting/receiving antenna 101 and input in the amplifying sections 102. Radio frequency signals that are input from each transmitting/receiving antenna 101 are amplified in the amplifying sections 102 and sent to each transmitting/receiving section 103. The amplified radio frequency signals are converted into baseband signals in each transmitting/receiving section 103, and input in the baseband signal processing section 104.

In the baseband signal processing section 104, user data that is included in the baseband signals that are input is subjected to a fast Fourier transform (FFT) process, an inverse discrete Fourier transform (IDFT) process, error correction decoding, a MAC retransmission control receiving process, and RLC layer and PDCP layer receiving processes, and transferred to the higher station apparatus 30 via the transmission path interface 106. The call processing section 105 performs call processing such as setting up and releasing communication channels, manages the state of the radio base station 10 and manages the radio resources.

Figure 14:
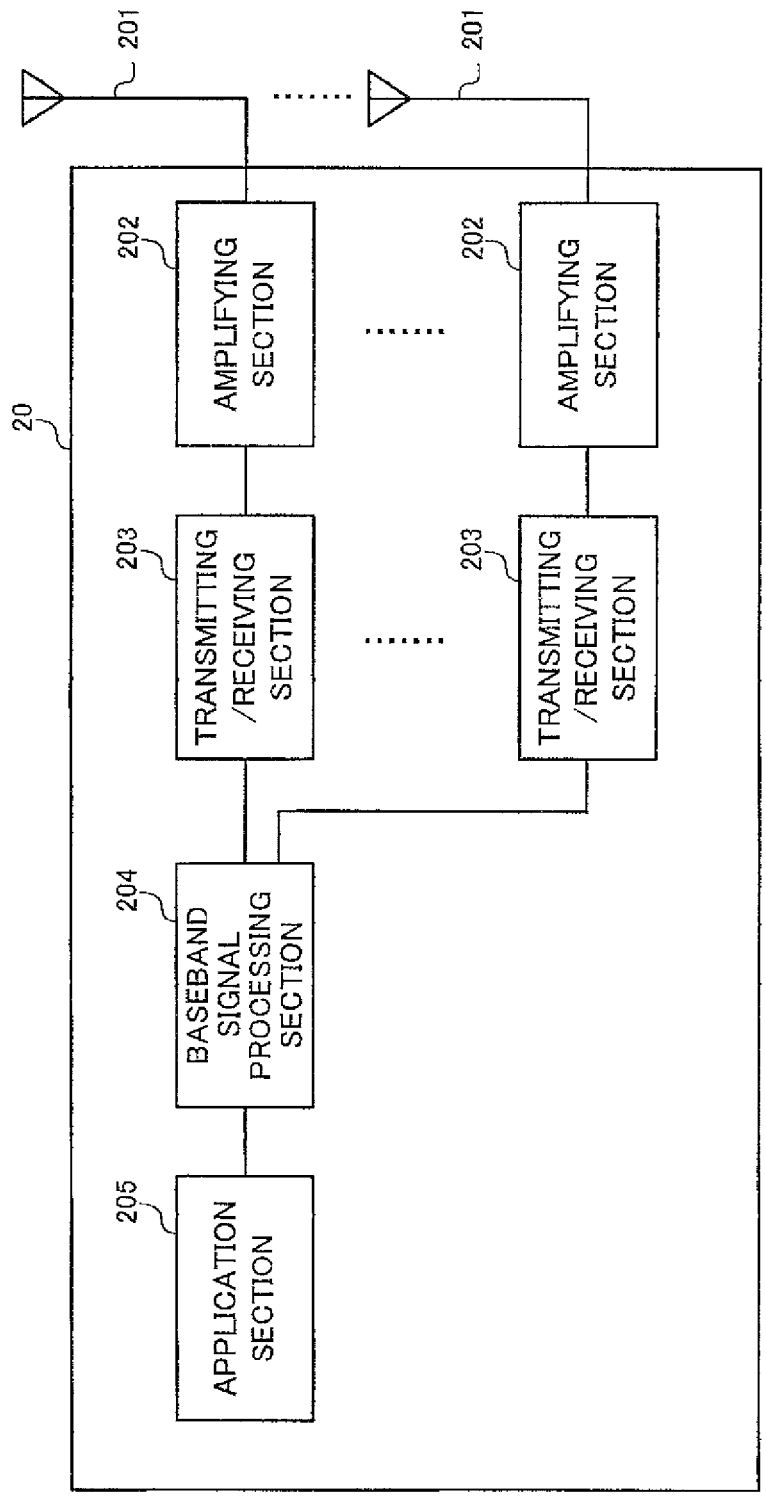
FIG. 14 is a diagram to explain a schematic structure of a user terminal according to the present embodiment.

FIG. 14 is a schematic structure diagram of a user terminal according to the present embodiment. A user terminal 20 has a plurality of transmitting/receiving antennas 201, amplifying sections 202, transmitting/receiving sections 203, a baseband signal processing section 204 and an application section 205.

Downlink data is received in a plurality of transmitting/receiving antennas 201 and input in the amplifying sections 202. The radio frequency signals input from each transmitting/receiving antenna 201 are amplified in the amplifying sections 202 and sent to each transmitting/receiving section 203. The amplified radio frequency signals are converted into baseband signals in each transmitting/receiving section 203, and input in the baseband signal processing section 204. In the baseband signal processing section 204, the baseband signals that are input are subjected to an FFT process, error correction decoding, a retransmission control receiving process and so on. User data that is included in the downlink data is transferred to the application section 205. The application section 205 performs processes related to higher layers above the physical layer and the MAC layer. Also, broadcast information that is included in the downlink data is also transferred to the application section 205.

Meanwhile, uplink user data is input from the application section 205 to the baseband signal processing section 204. In the baseband signal processing section 204, the user data that is input is subjected to a retransmission control transmission process, channel coding, pre-coding, a discrete Fourier transform (DFT) process, an IFFT process and so on, and then transferred to each transmitting/receiving section 203. Baseband signals that are output from the baseband signal processing section 204 are converted into a radio frequency band in the transmitting/receiving sections 203. After that, the radio frequency signals having been subjected to frequency conversion are amplified in the amplifying sections 202 and transmitted from the transmitting/receiving antennas 201.

Figure 15:
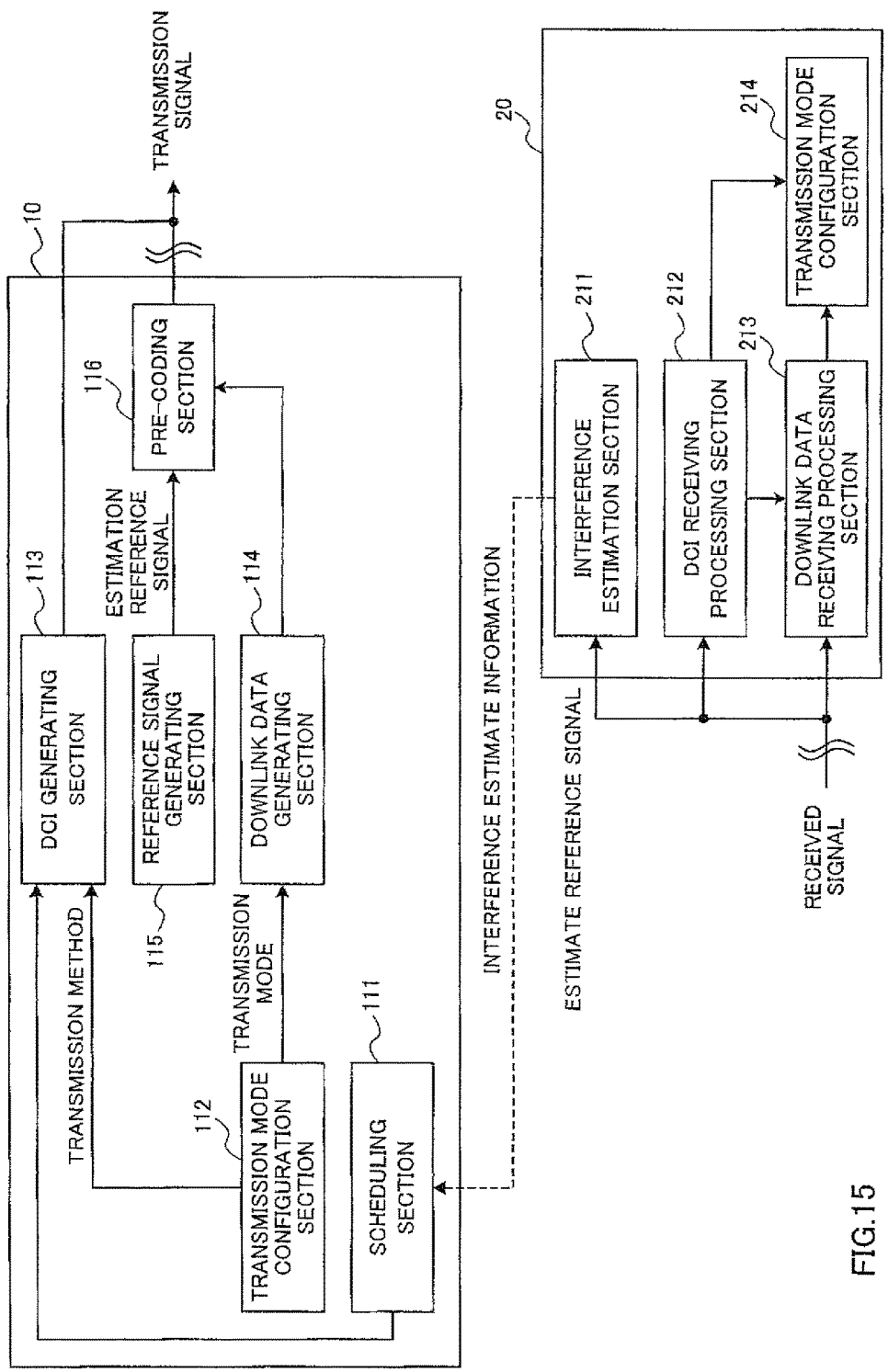
FIG. 15 provides diagrams to explain schematic structures of a radio base station and a user terminal according to the present embodiment.

Next, with reference to FIG. 15, functional structures of a radio base station 10 and a user terminal 20 will be explained in detail. FIG. 15 is a diagram to show a functional structure of a radio base station and a user terminal according to the present embodiment. Note that, the functional structure shown in FIG. 15 is comprised of baseband signal processing sections 104 and 204 and so on. Also, although FIG. 15 shows only part of the structures, the radio base station 10 and the user terminal 20 have components that are required, without shortage.

As shown in FIG. 15, the radio base station 10 has a scheduling section 111, a transmission mode configuration section 112, a downlink control information (DCI) generating section 113, a downlink data generating section 114, a reference signal generating section 115 and a pre-coding section 116.

The scheduling section 111 performs scheduling based on interference estimate information from the user terminal 20. As described above, interference estimate information may be any information to indicate the amount of interference and channel quality at a user terminal UE such as the received SINR, the path loss, a CQI, the SNR, CSI and so on. To be more specific, the scheduling section 111 determines user terminals 20 to be spatially multiplexed and/or non-orthogonal-multiplexed, and allocates radio resources based on interference estimate information. Also, the scheduling section 111 may determine the transmission power for the user terminal 20 to be non-orthogonal multiplexed.

The transmission mode configuration section 112 (a configuration section) configures, for the user terminal 20, one of a plurality of transmission modes including a first transmission mode to group a plurality of transmission methods and a second transmission mode to group a plurality of transmission methods. Also, the transmission mode configuration section 112 switches the transmission mode that to configure for that user terminal, by using higher layer signaling (for example, RRC signaling). Furthermore, the transmission mode configuration section 122 switches the transmission method to apply to downlink signals, between a plurality of transmission methods that are grouped in the transmission mode, by using signaling of a lower layer (for example, MAC signaling) than higher layer signaling or by using DCI.

Note that, transmission methods may be grouped in the first transmission mode and in the second transmission mode depending on whether or not the transmission methods require feedback information from user terminals UE (whether closed-loop or open-loop), or depending on whether the transmission methods involve MIMO or transmit diversity. Also, overlapping transmission methods may be included in both of the first transmission mode and the second transmission mode.

The DCI generating section 113 generates downlink control information (DCI) to be transmitted by the PDCCH or the EPDCCH and performs transmission processes (for example, coding, modulation, mapping to radio resources, etc.). The DCI includes PDSCH/PUSCH allocation information and so on. Also, the DCI includes various information to be required for the receiving processes of signals that are non-orthogonal-multiplexed. Also, the DCI may include information about the switching of the transmission method in the transmission mode that is configured for the user terminal 20.

The downlink data generating section 114 generates downlink user data and higher layer control information to be transmitted by the PDSCH, and performs transmission processes (for example, coding, modulation, mapping to radio resources) based on the transmission mode that is configured in the transmission mode configuration section 112. Higher layer control information includes control information that is transmitted by higher layer signaling (for example, RRC signaling), or signaling of a lower layer (for example, MAC signaling) than higher layer signaling and so on. Also, higher layer control information may include information about the configuration and information about the switching of the transmission mode for the user terminal UE. Furthermore, control information by MAC signaling may include the above information about the switching of the transmission methods.

The reference signal generating section 115 generates reference signals such as the CRS (Cell-specific Reference Signal), the CSI-RS, the DM-RS (FIG. 6), the estimation reference signal (FIG. 10) and so on, and performs transmission processes (for example, coding, modulation, mapping to radio resources, etc.). As explained in FIG. 6, a common DM-RS may be used between the user terminals 20 as a demodulation reference signal. Also, as explained with FIG. 10, an estimation reference signal is a reference signal that is used to estimate interference estimate information at a user terminal 20, and may be mapped to the same radio resources (resource elements) between peripheral radio base stations 10 and between all beams (streams and layers).

The pre-coding section 116 pre-codes (beam-forms) and transmits downlink signals that are output from the downlink data generating section 114 and reference signals that are output from the reference signal generating section 115. To be more specific, the pre-coding section 116 pre-codes and transmits the DM-RS by using a beamforming matrix to match the downlink signal.

Also, the pre-coding section 116 transmits an estimation reference signal by using the beamforming matrix M(T) at the time (second time), at which a downlink signal is transmitted based on the interference estimate information by this estimation reference signal, instead of using the beamforming matrix M(T-Δ) at time T-Δ (first time), at which the estimation reference signals is transmitted.

As shown in FIG. 15, a user terminal 20 has an interference estimation section 211, a DCI receiving processing section 212, a downlink data receiving processing section 213 and a transmission mode configuration section 214.

The interference estimation section 211 estimates interference estimate information based on an estimation reference signal from a radio base station 10 (performs channel estimation). The interference estimation section 211 may estimate interference estimate information (for example, the SINR), as shown in equation 9, based on this estimation reference signal and a legacy reference signal (for example, a CSI-RS). Alternatively, as shown in equation 10, the interference estimation section 211 may estimate interference estimate information by using an estimation reference signal without using a legacy reference signal (for example, a CSI-RS).

The DCI receiving processing section 212 blind-decodes DCI from the radio base station 10 and performs receiving processes (for example, demapping, demodulation, decoding and so on). As described above, the DCI may include information about the switching of the transmission method in the transmission mode that is configured for the user terminal 20.

The downlink data receiving processing section 213 performs receiving processes (for example, IRC, SIC, demapping, demodulation, decoding, etc.) of the downlink data (including higher layer control information) from the radio base station 10. Interference beams are canceled by linear filtering such as IRC, and the beam for the subject terminal is sampled. Also, downlink signals for other user terminals 20 (interference signals) that are multiplexed over the same beam are canceled by means of SIC, and the downlink signal for the subject terminal is sampled.

Also, the downlink data receiving processing section 213 may demodulate the downlink data based on common DM-RSs between user terminals 20 and the transmission power ratio between the user terminals 20. Also, as described above, higher layer control information may include information about the configuration and information about the switching of the transmission method in the transmission mode that is configured for the user terminal 20.

The transmission mode configuration section 214 configures the transmission mode for the user terminal UE based on the above information about the configuration or the above information about the switching of the transmission mode, and controls the downlink data receiving processing section 213 to perform downlink data receiving processes based on this transmission mode. Also, the transmission mode configuration section 214 may control the downlink data receiving processing section 213 to perform downlink data receiving processes to match the transmission method, based on information about the switching of the transmission method in the transmission mode that is configured for the user terminal 20.

As described above, with the radio communication system 1 according to the present embodiment, in a radio communication system which can use non-orthogonal multiple access (NOMA), a transmission mode to support NOMA/MU-MIMO is defined, so that spectral efficiency can be improved. The first transmission mode, which groups a plurality of transmission methods including NOMA/MU-MIMO, and The second transmission mode, which groups a plurality of transmission methods including NOMA/open-loop transmit diversity, are defined, so that it is possible to support various transmission methods without increasing the control load (first example).

Also, with the radio communication system 1 according to the present embodiment, an estimation reference signal is beam-formed by using the beamforming matrices $M_1(T)$ and $M_2(T)$ at time T, at which a downlink signal is transmitted, based on the interference estimate information by the estimation reference signal, multiplexed over the same radio resources with estimation reference signals in all beams from peripheral cells and transmitted, so that it is possible to improve the accuracy of the interference estimate information (second example).

The present invention can be implemented with various corrections and in various modifications, without departing from the spirit and scope of the present invention. That is to say, the descriptions herein are provided only for the purpose of illustrating examples, and should by no means be construed to limit the present invention in any way.

The disclosure of Japanese Patent Application No. 2013-021269, filed on Feb. 6, 2013, including the specification, drawings and abstract, is incorporated herein by reference in its entirety.

The invention claimed is:

1. A user terminal comprising:
    a receiver that receives transmission mode information, indicating a transmission mode to which spatial multiplexing of a plurality of layers is applied to a downlink signal for the user terminal, via radio resource control (RRC) signaling and receives downlink control information, via a physical downlink control channel, indicating whether or not a transmission method of superposing downlink signals for a plurality of user terminals, including the user terminal, is applied in the transmission mode; and
    a processor that controls reception of the downlink signal according to the transmission mode information and the downlink control information,
    wherein if the spatial multiplexing of the plurality of layers is applied and the downlink signals for the plurality of user terminals are superposed, the processor controls the reception of the downlink signal based on a power ratio of the downlink signals provided from a radio base station.

2. The user terminal according to claim 1, wherein the transmission mode is one of a plurality of transmission modes that includes a first transmission mode applying open-loop spatial multiplexing and a second transmission mode applying closed-loop spatial multiplexing.

* * * * *